(12) United States Patent
Ruden et al.

(10) Patent No.: US 7,872,830 B2
(45) Date of Patent: Jan. 18, 2011

(54) MAGNETIC MEDIUM STACK ASSEMBLY FOR A DATA STORAGE AND RETRIEVAL SYSTEM

(75) Inventors: Shawn A. Ruden, Longmont, CO (US); Roland Sesselmann, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 930 days.

(21) Appl. No.: 11/734,450

(22) Filed: Apr. 12, 2007

(65) Prior Publication Data
US 2008/0253019 A1    Oct. 16, 2008

(51) Int. Cl.
*G11B 17/02* (2006.01)
(52) U.S. Cl. ................................. 360/99.12
(58) Field of Classification Search .............. 360/99.12, 360/98.08
See application file for complete search history.

(56) References Cited

U.S. PATENT DOCUMENTS

| | | | |
|---|---|---|---|
| 4,864,443 A * | 9/1989 | Peterson ................. | 360/99.12 |
| 5,243,481 A * | 9/1993 | Dunckley et al. ........ | 360/99.08 |
| 5,528,434 A | 6/1996 | Bronshvatch et al. | |
| 5,615,067 A | 3/1997 | Jabbari et al. | |
| 5,724,208 A | 3/1998 | Yahata | |
| 5,731,928 A | 3/1998 | Jabbari et al. | |
| 5,760,999 A | 6/1998 | Yahata | |
| 5,880,905 A | 3/1999 | Kazmierczak et al. | |
| 5,880,906 A | 3/1999 | Lindrose | |
| 5,973,879 A | 10/1999 | Raffetto et al. | |
| 6,028,739 A | 2/2000 | Lindrose | |
| 6,055,123 A | 4/2000 | Kazmierczak et al. | |
| 6,212,031 B1 | 4/2001 | Kazmierczak et al. | |
| 6,222,700 B1 | 4/2001 | Martin et al. | |
| 6,282,054 B1 * | 8/2001 | Luo ........................ | 360/98.08 |
| 6,417,988 B1 | 7/2002 | Renken et al. | |
| 6,462,902 B1 | 10/2002 | Luo et al. | |
| 6,483,661 B1 | 11/2002 | Martin et al. | |
| 6,567,238 B1 * | 5/2003 | Renken et al. ........... | 360/99.12 |
| 6,603,634 B1 | 8/2003 | Wood et al. | |
| 6,760,188 B2 | 7/2004 | Choo et al. | |
| 6,817,026 B2 | 11/2004 | Berg et al. | |
| 7,379,267 B2 * | 5/2008 | Engesser et al. ......... | 360/99.12 |
| 2002/0109939 A1 | 8/2002 | Schwandt et al. | |

OTHER PUBLICATIONS

U.S. Appl. No. 11/786,479, "Assembly and Method for Installing a Disc Clamp," filed Apr. 12, 2007.

* cited by examiner

*Primary Examiner*—Angel A. Castro
(74) *Attorney, Agent, or Firm*—Fellers, Snider, et al.

(57) ABSTRACT

A magnetic medium stack assembly includes a hub, a magnetic medium, and a clamp fixing the magnetic medium to the hub. The hub and clamp include engaging flange members that enable the hub and clamp to lock together without the use of external hardware or an adhesive. The clamp applies a substantially uniform compressive force on the magnetic medium, which helps reduce circumferential acceleration.

20 Claims, 15 Drawing Sheets

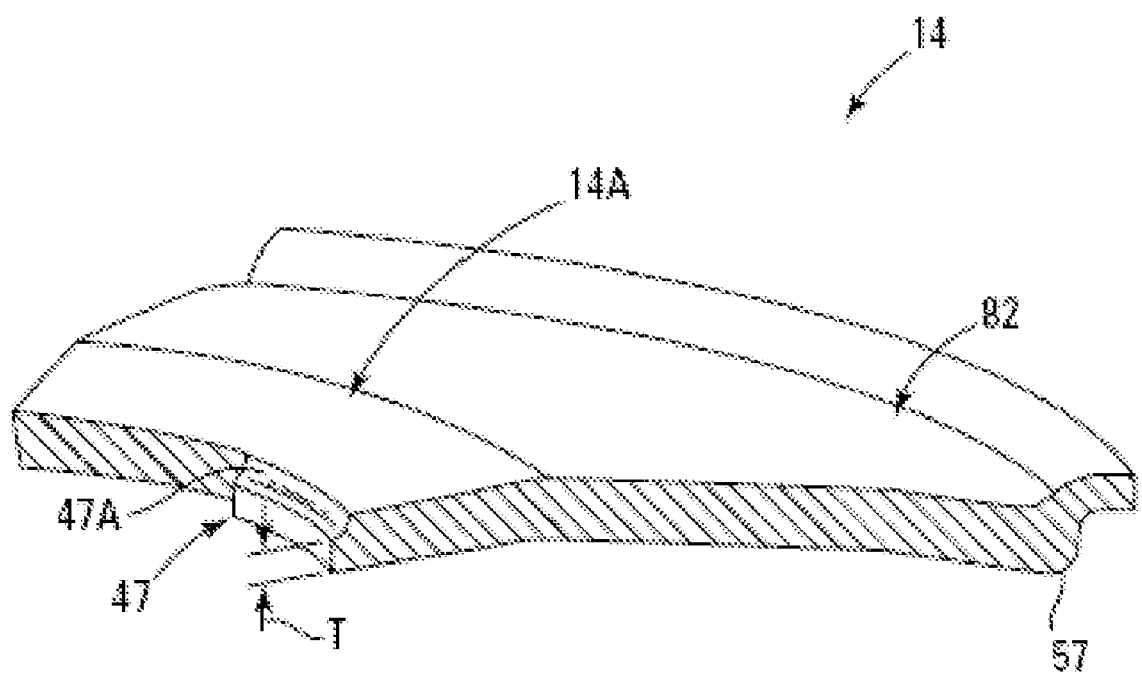
FIG. 3B
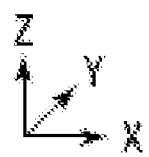

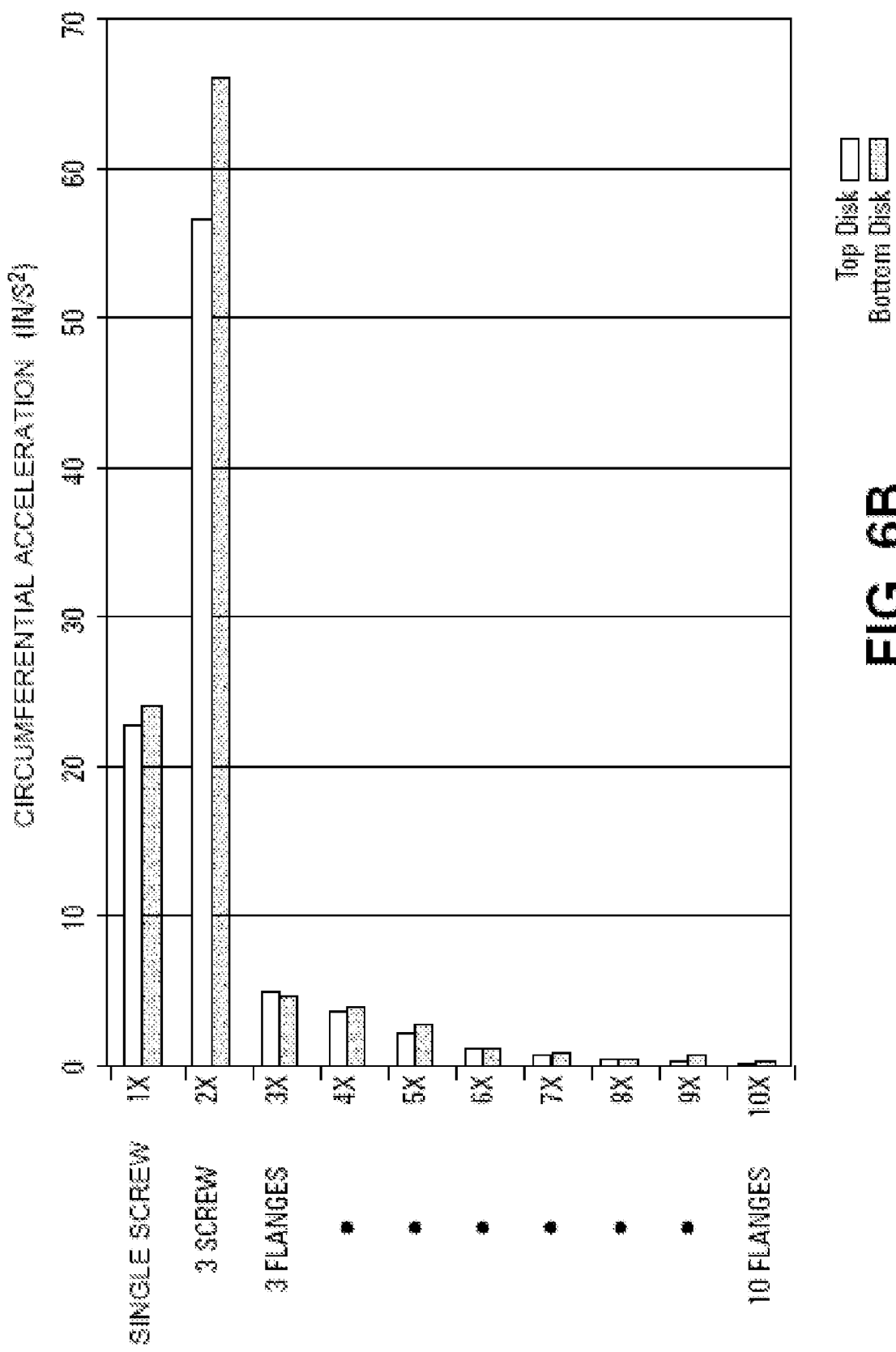

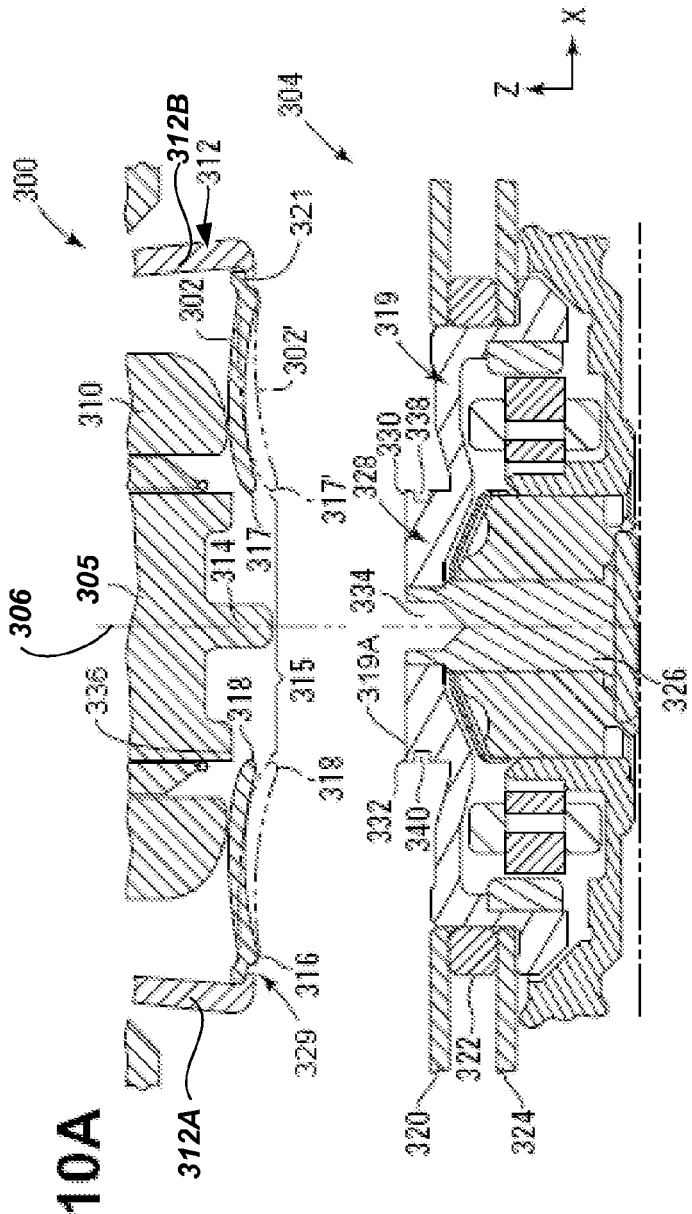
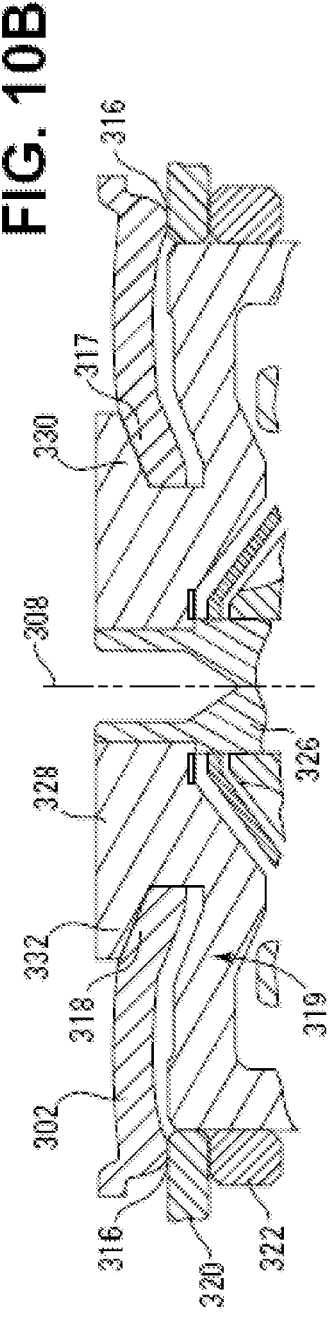
FIG. 10A
FIG. 10B

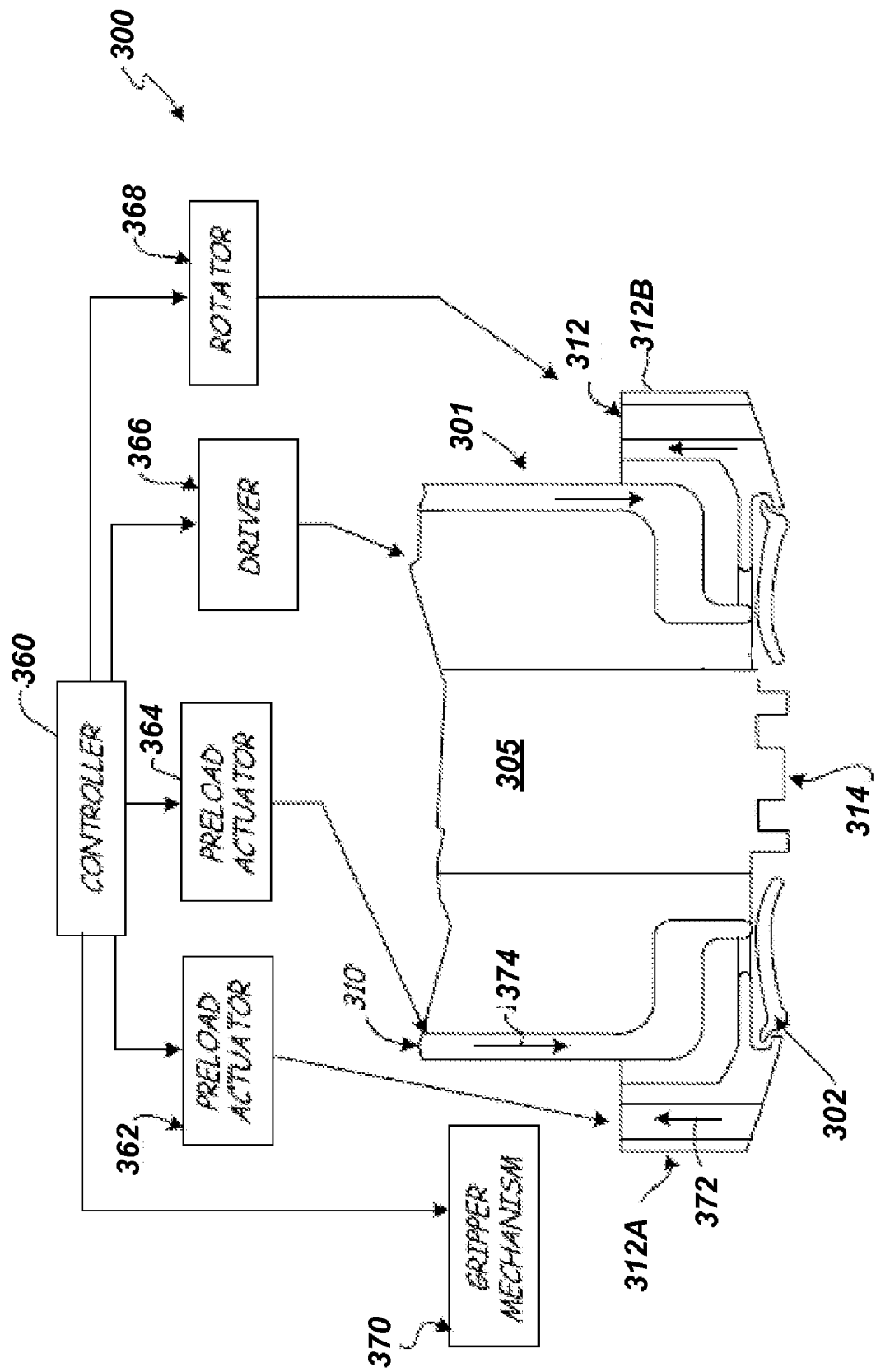

MAGNETIC MEDIUM STACK ASSEMBLY FOR A DATA STORAGE AND RETRIEVAL SYSTEM

TECHNICAL FIELD

The invention relates to a magnetic data storage and retrieval system. More particularly, the invention relates to an assembly and method for mounting a magnetic medium on a motor hub of a magnetic data storage and retrieval system.

BACKGROUND

In one type of magnetic data storage and retrieval system, such as a disc drive, a magnetic medium stack assembly includes a magnetic medium (or a plurality of magnetic media), such as a disc, mounted about a motor hub (also known as a "spindle hub"). In one type of system, the motor hub is rotatably coupled to a spindle motor, which rotates the motor hub, and consequently, the magnetic medium. A clamp typically fixes the magnetic medium to the motor hub, such as by applying a compressive force on the magnetic medium, which may abut portions of both the hub and the clamp. During operation of the magnetic storage system, an actuator moves one or more transducing heads (or another type of data transfer member) to selected positions adjacent to a top surface of the magnetic medium in order to read magnetically-encoded data stored on the magnetic medium (e.g., by sensing magnetic flux transitions) and/or write data to the magnetic medium (e.g., by inducing magnetic flux transitions in the magnetic medium). In a magnetic disc, data is written in concentric, radially-spaced data tracks. The transducing head is typically supported above the magnetic medium by an air bearing (i.e., a cushion of air) above the magnetic medium, which results when the magnetic medium generates currents of air as it rotates at high speeds. A distance between the transducing head and magnetic medium during operation may be referred to as a "fly height" of the transducer (or the slider, which carries the transducer on the actuator).

In general, it is desirable for the clamp to exert a substantially uniform clamping force on the magnetic medium. For example, an even clamping force helps maintain a substantially flat magnetic medium top surface in order to, for example, help maintain a constant slider fly height. In addition, it may be desirable to minimize circumferential acceleration. Circumferential acceleration is the out-of-plane acceleration of an imaginary dot on a substantially circular track caused by circumferential curvature (e.g., waviness or otherwise uneven) of the top surface of the magnetic medium. The circumferential acceleration value is typically unique to the specific disc at a certain spin speed.

Circumferential acceleration may affect the ability of the transducing head, which is carried by the slider, to read or write to the magnetic medium. If the top surface of the magnetic medium is uneven, the air bearing between the magnetic medium and the slider may be uneven, resulting in an uneven slider fly height. Thus, the landscape of the top surface of the magnetic medium affects the path of the slider and transducing head.

Physical distortion of the magnetic medium attributable to an uneven clamping force may also lead to the generation of operational errors during reading and recording of data no the magnetic medium. For example, the physical distortion may distort the size of one or more bits, which are areas of the magnetic medium in which data is written.

In addition, it may be desirable for the magnetic medium to be capable of withstanding relatively high levels of shock without shifting with respect to the motor hub. If the magnetic medium shifts, the transducer may inadvertently read or write to incorrect data tracks. As areal densities increase and the concentric data tracks on a magnetic disc become smaller, the tolerance for the transducer to align with a data track decreases, and it becomes more important to minimize shifting of the magnetic medium relative to the motor hub.

From a manufacturing perspective, it is also desirable for the mode of attachment to be capable of being integrated into an efficient manufacturing process (e.g., high speed and high volume manufacturing). Thus, it is important to maintain a substantially stable magnetic medium position with respect to a point of reference, such as the motor hub.

SUMMARY

In general, the invention is directed toward a magnetic medium stack assembly and method for mounting a magnetic medium on a rotatable motor hub of a magnetic data storage and retrieval system. In a magnetic medium stack assembly in accordance with the invention, a clamp includes at least one clamp flange that is configured to engage with a corresponding hub flange of a motor hub. The engagement between the clamp and hub flanges "locks" the clamp onto the hub without the use of external mechanical attachment devices, such as screws, adhesives or retaining rings. In one embodiment, a preload force is applied to a clamp while the claim is in a first rotational orientation, and a protrusion portion of a hub is introduced into an aperture of the clamp. The preloaded clamp is subsequently rotated to a second rotational orientation. In the second rotational orientation, clamp flanges of the clamp engage with hub flanges of the hub, thereby fixing a position of the clamp with respect to the hub.

The clamp fixes one or more magnetic media (e.g., magnetic discs) to the motor hub by applying a substantially uniform and symmetrically distributed force (or pressure) on the magnetic medium. In one embodiment, the clamp contacts a magnetic medium along one or more annular contact surfaces. As a result of the substantially uniform distribution of force on the magnetic medium, the magnetic medium undergoes less distortion as compared to disc stack assemblies that rely on one or more screws to attach a clamp to a hub. The reduction in distortion contributes to a reduction in circumferential acceleration because the top surface of the magnetic medium remains substantially even and the fly height of a slider remains substantially constant.

A process of assembling disc stack assembly in accordance with the present invention may also be more efficient and streamlined because the mating clamp and hub configuration eliminates a need for external hardware to fix the clamp to the hub. Thus, by eliminating the need for external hardware, the process of disc stack assembly in accordance with the present invention also helps minimize contaminants that are introduced into the disc drive during the assembly process. In some embodiments, however, external hardware may be used in conjunction with the mating clamp and hub configuration.

While the invention is described herein with reference to a disc stack assembly employing a magnetic disc, the invention is applicable to all types of magnetic media that are attached to a motor hub in a magnetic data storage and retrieval system.

In one embodiment, the invention is directed to a magnetic medium stack assembly comprising a hub rotatable about an axis of rotation and comprising a hub flange defining a hub void area, a clamp comprising a contact surface and clamp flange defining a clamp void area, wherein in a first rotational orientation, the clamp flange is received in the hub void area and the hub flange is received in the clamp void area, and in a second rotational orientation, the clamp flange is engaged with the hub flange, and a magnetic medium fixed to the hub by the clamp, wherein the contact surface of the clamp contacts the magnetic medium.

In another embodiment, the invention is directed to a disc drive comprising a spindle motor, a hub rotatably coupled to the spindle motor and comprising at least one hub flange, a disc rotatable by the spindle motor via the hub, and a clamp fixing the disc to the hub, the clamp comprising a clamp body defining an aperture configured to receive at least a portion of the hub and at least a first clamp flange and a second clamp flange, the first and second clamp flanges defining at least one receiving void area. The receiving void area is configured to receive the hub flange when the clamp is in a first rotational orientation, and at least one of the first flange or the second flange are configured to engage with the hub flange when the clamp is in a second rotational orientation.

In yet another embodiment, the invention is directed to a method of assembling a magnetic storage apparatus. The method comprises preloading a clamp comprising a clamp body defining a clamp aperture and at least a first clamp flange and a second clamp flange extending from the clamp body, the first and second clamp flanges defining a clamp void area, aligning the clamp void area with at least one of a first hub flange and a second hub flange extending from a protrusion portion of a hub, introducing the protrusion portion of the hub into the clamp aperture, and rotating the clamp to engage the first hub flange with the first clamp flange and the second hub flange with the second clamp flange.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3B is a partial perspective view of one of the clamp flanges shown in FIG. 3A.

In FIG. 4A, the clamp is in a first rotational orientation and in FIG. 4B, the clamp is in a second rotational orientation.

FIG. 6B is a chart comparing the circumferential acceleration of disc stack assemblies including clamps having different numbers of flanges.

In FIG. 8A, the clamp is in a first rotational orientation and in FIG. 8B, the clamp is in a second rotational orientation.

FIG. 10A is a cross-sectional view of the installation tool and disc and hub stack of FIG. 9.

FIG. 10B is a cross-sectional view of an assembled disc stack assembly, after the installation tool has attached the clamp to the disc and hub stack and released the load from the clamp.

FIG. 10C is a cross-sectional view of an assembly tool that may be used to install a clamp on a spindle hub.

DETAILED DESCRIPTION

Figure 1:
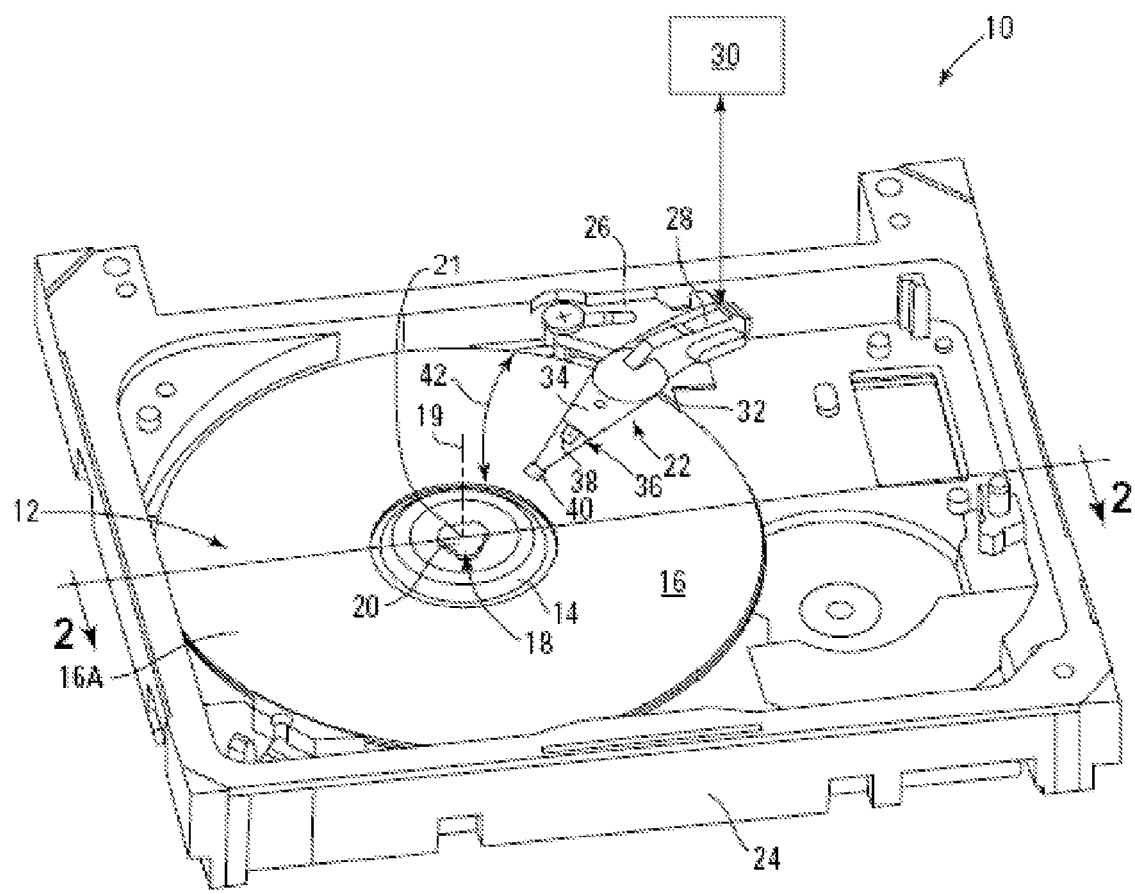
FIG. 1 is a perspective view of disc drive system employing a disc stack assembly in accordance with one embodiment of the present invention, which includes two discs fixed to a hub with a clamp.

FIG. 1 is a perspective view of disc drive system 10, which is an example of a magnetic data storage and retrieval system employing disc stack assembly 12 in accordance with one embodiment of the present invention. Numerous details of disc drive system 10 are removed from FIG. 1 as well as the description of FIG. 1 for clarity of illustration and description. In other embodiments, disc stack assembly 12 may be incorporated into other types of magnetic data storage and retrieval systems.

Disc stack assembly 12 includes clamp 14, top disc 16, bottom disc 17 (shown in FIG. 2), and hub 18, which includes protrusion portion 20. Disc drive system 10 also includes actuator 22, housing 24, arm 26, which carries actuator 22 and pivots about axis 28, drive controller 30, and e-block assembly 32. Actuator 22 includes actuator arm 34, suspension assembly 36, load beam 38, and slider 40.

During operation of disc drive system 10, a spindle motor (not shown) rotates disc stack assembly 12 at high speeds as a transducing head (not shown) disposed on slider 40 of actuator 22 reads and writes data to discs 16 and 17. In the embodiment of disc drive system 10 shown in FIG. 1, a shaft (shown in FIG. 2) of the spindle motor is coupled to hub 18, and as the shaft rotates, hub 18 rotates disc stack assembly 12. In another type of disc drive system 10, a shaft of the spindle motor does not rotate, but rather, hub 18 is rotationally coupled to the shaft, and as the spindle motor rotates hub 18, the entire disc stack assembly 12 rotates.

In the embodiment of FIG. 1, the shaft of the spindle motor extends at least partially into protrusion portion 20 of hub 18. Discs 16 and 17 are mounted around hub 18, and clamp 14 fixes a position of discs 16 and 17 with respect to hub 18. As hub 18 rotates, the discs 16 and 17 rotate about axis of rotation 19.

Clamp 14 may be formed from a substantially rigid material exhibiting some degree of elasticity, such as, but not limited to stainless steel, plastics or other metals exhibiting the desired spring rate characteristics. Elasticity is preferable so that when clamp 14 is prestressed (and therefore, deflects) during installation of clamp 14 on hub 18, clamp 14 substantially returns to its original shape when the prestress load is removed. As used herein, "prestressed" and "preloaded" are used interchangeably to refer to a state in which a load is applied to clamp 14. The material for clamp 14 should be capable of exerting a desirable force on discs 16 and 17.

Clamp 14 clamps discs 16 and 17 to hub 18 without the use of external hardware (e.g., screws or a retaining ring) or an adhesive.

By removing the need for external hardware to attach clamp 14 to hub 18, a top cover may be attached to the spindle motor of disc drive system 10 via disc stack assembly 12. In many single screw disc stack assemblies, a center portion of the disc stack assembly 12 (which is coupled to a motor shaft) is occupied by a screw that attaches a hub to a clamp and as a result, another screw may not be introduced into the center portion to attach a top cover to the disc stack assembly. In contrast, disc stack assembly 12 including interlocking clamp 14 and hub 18 design includes an unoccupied center portion 21, which may receive a screw to attach a top cover to a motor of disc drive assembly 10. When a top cover is attached to the disc drive assembly 10 motor in this manner, disc drive system 10 may be more rigid (i.e., because the top cover provides another rigid point of attachment for the motor), which may result in better disc drive assembly 10 performance.

In addition to removing the need for external hardware to attach clamp 14 to hub 18, a disc stack assembly in accordance with the present invention also eliminates the need for spanner holes in the clamp. In existing disc stack assemblies using one screw to attach a clamp to a hub, the clamp may define one or more spanner holes that are used to gain access to the hub and hold the hub in place during installation of the clamp. The hub is typically rotatably coupled to a motor, and therefore may rotate freely during installation of the clamp unless the hub is held in place. Spanner holes may introduce pressure deviations into the clamp, which may contribute to circumferential acceleration.

Actuator 22 is mounted to housing 24 via arm 26 and is pivotable relative to discs 16 and 17 about axis 28. Actuator arm 34 carries head suspension assembly 36, which includes load beam 38 and air bearing slider 40 coupled to load beam 38 by a flexure. Slider 40 carries a transducing head, which may have a reader portion, such as an MR head, for reading information from disc 16 and/or disc 17 and a writer portion (e.g., a perpendicular or parallel writer) for encoding data on disc 16 and/or disc 17.

Drive controller 30 (schematically shown in FIG. 1) is coupled to actuator 22. Drive controller 30 may be mountable within disc drive system 10 or located outside of disc drive system 10 with suitable electrical and/or mechanical connection to actuator 22. During operation, drive controller 30 receives position information indicating a location on disc 16 and/or disc 17 to be accessed. The location may be, for example, a specific bit or series of bit within one or more concentric, radially-spaced data tracks. Based on the position information, drive controller 30 provides a position signal to actuator 22, which causes arm 26 to pivot about axis 28 and move actuator 22. In one embodiment, a voice coil motor (not shown) may control the rotation and positioning of arm 26. The movement of actuator 22 causes slider 40 to move radially over top surface 16B of disc 16 and in a path indicated by arrow 42. Drive controller 30 and actuator 22 operate in a known manner so that the transducing head carried by slider 40 is positioned over the desired location of disc 16 and/or disc 17. Air current is generated as discs 16 and 17 spin, thus creating an aerodynamic surface that supports slider 40. A distance between top surface 16B of disc 16 and slider 40 is typically referred to as a "fly height" of slider 40. Once properly positioned, the transducing head performs a desired read or write operation. For example, read and write signals may be transmitted to the transducing head via conductive traces that extend along actuator 22 to a control device.

Figure 2:
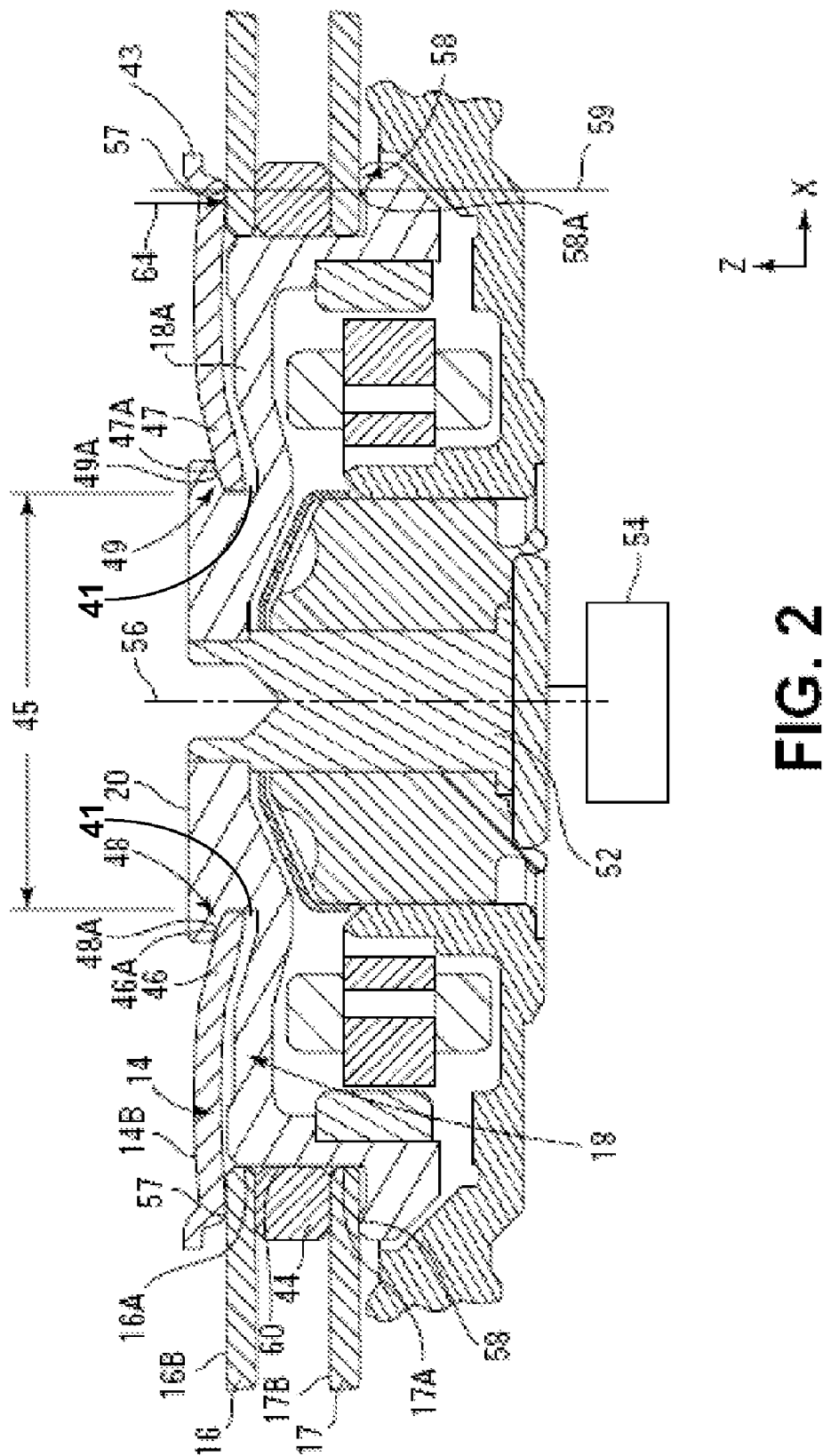
FIG. 2 is a partial cross-sectional view of the disc stack assembly of FIG. 1, where a section was taken along line 2-2 in FIG. 1.

FIG. 2 is a partial cross-sectional view of disc stack assembly 12 of disc drive system 10 taken along line 2-2 in FIG. 1. Disc stack assembly 12 includes two discs 16 and 17 separated by spacer 44 and fixed to hub 18 with clamp 14. While two discs 16 and 17 are shown in disc stack assembly 12, in other embodiments, disc stack assembly 12 may include any suitable number of discs (or another type of magnetic media), such as one or greater than two discs, in any suitable arrangement.

Clamp body 14A of clamp 14 defines clamp aperture 45, which is configured to receive and engage with protrusion portion 20 of hub 18. Clamp 14 also includes outer flange 43, clamp flanges 46 and 47, which radially extend into clamp aperture 45 and are integral with clamp body 14A. In alternate embodiments, clamp flanges 46 and 47 and clamp body 14A may be separate components that are attached using any suitable attachment means, such as welding (e.g., ultrasonic welding), a mechanical attachment (e.g., brackets), an adhesive or combinations thereof. Hub 18 includes hub body 18A, and hub flanges 48 and 49 extending from hub protrusion portion 20. Hub body 18A defines channel 41. Hub body 18A, hub protrusion portion 20, and hub flanges 48 and 49 are integral. In alternate embodiments, however, hub body 18A, hub protrusion portion 20, and/or hub flanges 48 and 49 may be separate components that are attached together using any suitable attachment means, such as the means previously discussed.

When disc stack assembly 12 is assembled, clamp flanges 46 and 47 extending from clamp body 14A engage with hub flanges 48 and 49, respectively, extending from hub body 18A of hub 18, such that clamp 14 and hub 18 are "locked" together without external hardware or adhesives. In particular, clamp flanges 46 and 47 extending from clamp body 14A are disposed in channel 41 of hub body 18A to engage with hub flanges 48 and 49 extending from hub body 18A. Clamp flange 46 and hub flange 48 have similar cross-sectional contours, and as a result, surface 46A of clamp flange 46 is configured to abut surface 48A of hub flange 48. Similarly, surface 47A of clamp flange 47 is configured to abut surface 49A of hub flange 49. When clamp 14 and hub 18 are locked together, clamp 14 is discouraged from moving in a z-axis direction (orthogonal x-z axes are shown in FIG. 2), which fixes the z-axis positions of discs 16 and 17 between clamp 14 and hub 18. It is believed that the angled cross-sectional contours of surfaces 46A, 47A, 48A, and 49A of clamp flanges 46-49, respectively, also help distribute compressive forces between the respective clamp flange 46-49 and disc contact surface 57 of clamp 14.

Hub 18 defines planar surface 58 for supporting disc 17. In one embodiment, inner edge 58A of planar surface 58 is aligned with disc contact surface 57 of clamp 14, as indicated by line 59. This alignment helps to match the diameter of disc contact surface 57 with the diameter of planar surface 58 in order to allow planar surface 58 to provide equal and opposite forces to axial force 64 exerted by clamp 14 on discs 16 and 17. Hub 18 also defines cylindrical portion 60 that engages with inner surface 16A of disc 16 and inner surface 17A of disc 17 when discs 16 and 17 are mounted around hub 18. When mounted around and engaged with cylindrical portion 60 of hub 18, discs 16 and 17 resist movement in the x-y plane.

Spindle motor 54 (schematically shown) rotates motor shaft 52 during operation of disc drive system 10 (FIG. 1), which extends into protrusion portion 20 of hub 18, thereby rotating hub 18. Disc stack assembly 12 is centered about axis of rotation 56 of shaft 52.

In disc stack assembly 12 in accordance with the present invention, circumferential acceleration is minimized because clamp 14 exerts a substantially uniformly distributed axial compressive force 64 on discs 16 and 17. In the embodiment shown in FIG. 2, the substantially uniform distribution of axial compressive force 64 is at least partially attributable to the fact that clamp 14 engages disc 16 along a concentric contact surface 57. Concentric contact surface 57 helps distribute compressive force 64 evenly across discs 16 and 17.

The substantially uniform distribution of axial compressive force 64 attributable to concentric contact surface 57 also allows top surface 16B of disc 16 and top surface 17B of disc 17 to remain substantially flat (i.e., a cross-section of top surfaces 16B and 17B taken along the x-z plane results in discs 16 and 17 having substantially constant thickness (measured in the z-axis direction). For example, a "substantially flat" disc 16 exhibits little to no radial slope (i.e., coning), circumferential curvature, or radial curvature. In contrast, in disc stack assemblies in which a clamp is attached to a hub with more than one screw, forces are applied to the disc(s) at discrete points, which may result in uneven top surfaces of discs 16 and 17. In disc stack assemblies relying on a single screw to attach the clamp to the hub, it may be necessary to apply a relatively high torque to the single screw in order to achieve the necessary clamping force. In reaction to the relatively high torque applied to the screw, the clamp may deflect and "spread" outward (i.e., in the x-y plane), and in the process of spreading outward, the clamp may wipe over surface of an underlying disc. This may cause inconsistencies in the top surface of the disc, which may contribute to circumferential acceleration as well as introduce contaminants into the disc drive assembly. While screws may also be used in conjunction with a disc stack assembly of the present invention, the self-locking features of clamp 14 and hub 18 allows for a more even distribution of forces on discs 16 and 17.

In addition, axial compressive force 64 is substantially normal to top surface 16B of disc 16 and top surface 17B of disc 17, which helps create a frictional force in the x-y plane between clamp 14, discs 16 and 17, and planar surface 58 of hub 18, thereby helping to prevent clamp 14, discs 16 and 17, and hub 18 from shifting relative to each other during operation of disc drive system 10 (e.g., when disc drive system 10 is subjected to high levels of shock and vibration).

Figure 3A:
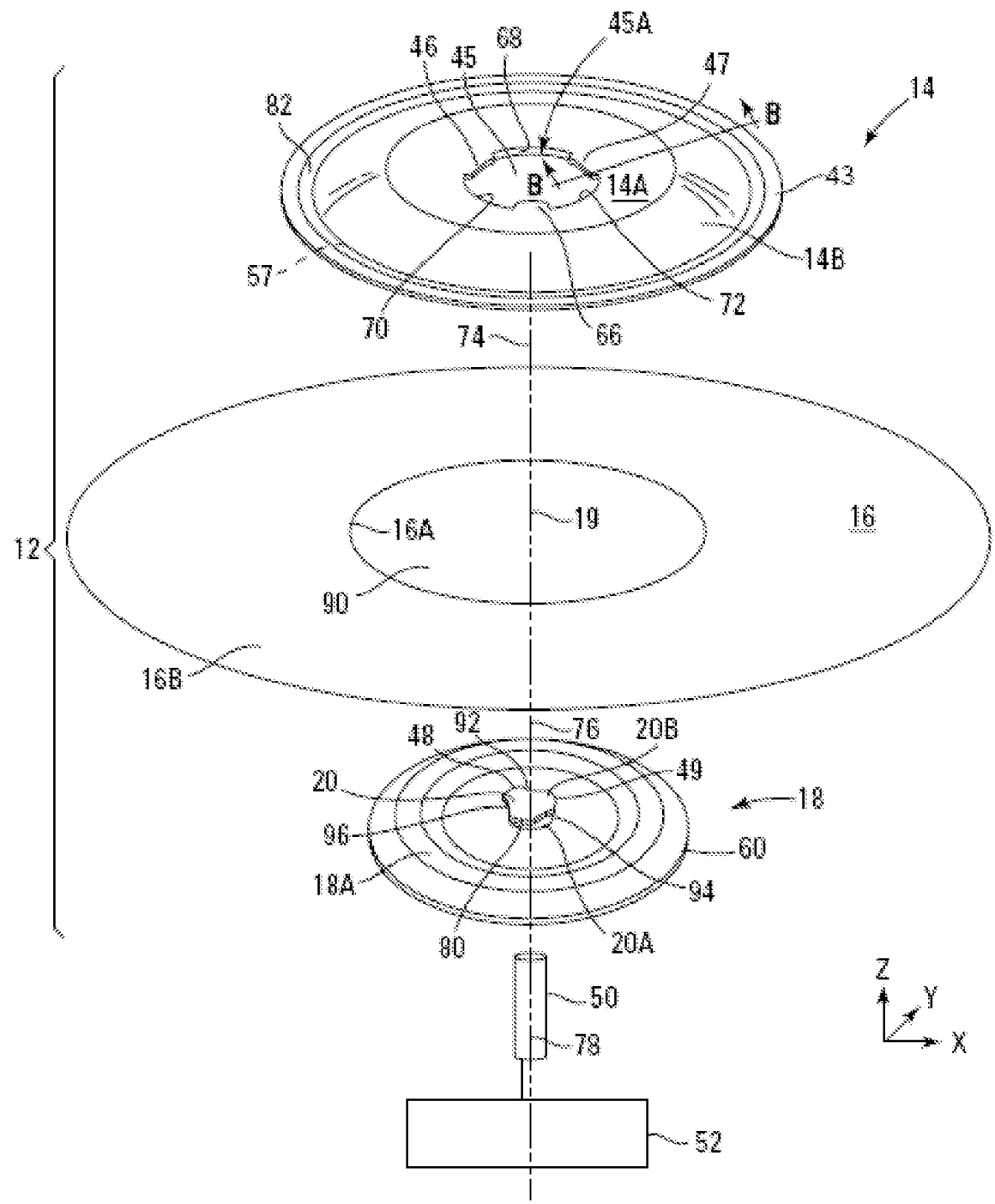
FIG. 3A is an exploded perspective view of the disc stack assembly of FIG. 1, where one disc has been removed for clarity of illustration, and a shaft is coupled to spindle motor.

FIG. 3A is an exploded perspective view of disc stack assembly 12 of disc drive system 10 of FIG. 1, where disc 17 and spacer 44 have been removed for clarity of illustration. Also shown in FIG. 3A is shaft 50, which is coupled to spindle motor 52. Shaft 50 and spindle motor 52 are schematically shown in FIG. 3A. Clamp 14, disc 16, and hub 18 are not necessarily shown in proper scale relative to each other. Rather, the relative proportions of clamp 14, disc 16, and hub 18 may depend upon the type of disc drive system 10 into which disc stack assembly 12 is incorporated.

Center axis 74 of clamp aperture 45, disc 16 axis of rotation 19, center axis 76 of hub 18, and shaft 50 axis of rotation 78 are coaxially aligned, such that shaft 50 is received in protrusion portion 20 of hub 18, inner surface 16A of disc 16 is disposed around cylindrical surface 60 of hub 18, and clamp aperture 45 receives protrusion portion 20 of hub 18.

As previously discussed, clamp body 14A of clamp 14 defines clamp aperture 45. Clamp aperture 45 is shaped to receive protrusion portion 20 of hub 18. During assembly of disc stack assembly 12, center axis 74 of clamp 14 aligns with center axis 19 of rotation of discs 16 and 17, which aligns with protrusion portion 20 of hub 18 and shaft 50 of disc drive system 10. While in the embodiment shown in FIG. 3A, aperture 45 is centered with respect to clamp body 14A (and therefore symmetric about center axis 74 of clamp aperture 45), in some embodiments, clamp aperture 45 may be offset relative clamp body 14A in order to create eccentric rotation of clamp 14 relative to center axis 19 of rotation of discs 16 and 17.

Extending into aperture 45 are clamp flanges 46, 47, and 66. In the embodiment shown in FIG. 3A, clamp flanges 46, 47, and 66 are substantially perpendicular to center axis 74 of clamp aperture 45. In alternate embodiments, clamp 14 may include any suitable number of flanges of any suitable size and oriented at any suitable angle with respect to center axis 74 of clamp aperture 45. Because flanges 46, 47, and 66 do not extend around the entire inner perimeter 45A of clamp aperture 45, void areas 68, 70, and 72 are defined between adjacent clamp flanges 46, 47, and 66.

Annular indentation 82 in clamp body 14A near outer perimeter 14B of clamp body 14A defines contact surface 57 (in phantom lines) for positively engaging with disc 16 when disc stack assembly 12 is assembled. In addition, clamp body 14A defines outer flange 43, which provides a feature for handling clamp 14 during a manufacturing process for assembling disc stack assembly 12, as described in further detail below in reference to FIGS. 9-10B. In alternate embodiments, contact surface 57 may be otherwise defined by clamp body 14A (e.g., with a plurality of notches formed in clamp body 14A rather than an annular indentation 82).

Inner surface 16A of disc 16 defines disc aperture 90. Although not shown in FIG. 3A, inner surface 17A of disc 17 defines a similar aperture. Aperture 90 is configured to fit around cylindrical surface 60 of hub 18. In one embodiment, inner surface 16A of disc 16 abuts cylindrical surface 60 of hub 18 in order to help fix a position of disc 16 in the x-y plane. By substantially fixing a position of disc 16 in the x-y plane, the propensity for slider 40 (shown in FIG. 1) to correctly align with a data track on disc 16 increases.

Hub 18 includes body portion 18A, protrusion portion 20 extending from body portion 18A, hub flanges 48, 49, and 80 extending from protrusion portion 20, and cylindrical surface 60. Protrusion portion 20 of hub 18 further includes stem 20A and flange platform 20B, which is integral with stem 20A. However, in other embodiments, stem 20A and flange platform 20B may be separate components that are attached together. Extending from flange platform 20B are flanges 48, 49, and 80, which may or may not be integral therewith. Flanges 48, 49, and 80 define a plurality of void areas 92, 94, and 96. Shaft 50 is aligned to extend into and engage with stem 20A of protrusion portion 20 of hub 18.

In the embodiment shown in FIG. 3A, hub 18 is an integral unit. However, in some embodiments, one or more of the elements (body portion 18A, stem 20A, flange platform 20B, and flanges 48, 49, and 80) of hub 18 may be separate from and attached to body portion 18A using any suitable attachment means, such as a welding, a mechanical attachment means or an adhesive. Furthermore, in the embodiment shown in FIG. 3A, hub 18 is symmetrical about center axis 76. In other embodiments, hub 18 may be asymmetrical about center axis 76, depending on the type of rotation desired for hub 18 and/or disc stack assembly 12.

As described in reference to FIG. 2, after assembly of disc stack assembly 12, when clamp 14 is in a particular rotational orientation, clamp flanges 46 and 47 are configured to engage with hub flanges 48 and 49, respectively, of hub 18. In addition, clamp flange 66 is configured to engage with hub flange 80, which is described below. Clamp flanges 46, 47, and 66 and hub flanges 48, 49, and 80 are sized in operative relation to one another. For example, in one embodiment, clamp flanges 46, 47, and 66 are the same size as hub flanges 48, 49, and 80. In another embodiment, clamp flanges 46, 47, and 66 and hub flanges 48, 49, and 80 are different sizes but sized such that clamp flanges 46, 47, and 66 and hub flanges 48, 49, and 80 may still engage with each other.

Clamp body 14A and hub body 18A include complementary surface configurations so that clamp body 14A and hub body 18A mate together when disc stack assembly 12 is assembled.

FIG. 3B is a partial perspective cross-sectional view of clamp 14 taken along line 3B-3B in FIG. 3A, and shows the curved profile of clamp body 14A created by indentation 82 and details of clamp flange 47. The details of clamp flange 47 are representative of the other clamp flanges 46 and 66. As previously shown in FIG. 2, surface 47A of clamp flange 47 has a slanted profile, which engages with a hub flange having a similar profile. Clamp flange 47 also has thickness T, which is attributable to surface 47A of clamp flange 47 slanting from clamp body 14A to clamp flange 47.

When surface 47A of clamp flange 47 (and corresponding surfaces of the other clamp flanges 46 and 66) are engaged with a respective hub flange surface (e.g., surface 49A of hub flange 49 in FIG. 2), clamp body 14A is stressed (i.e., a load is applied to clamp body 14A), thereby deflecting disc contact surface 57 in the negative z-axis and positively engaging disc contact surface 57 with top surface 16B of disc 16. In particular, disc contact surface 57 applies a substantially axial compressive force on top surface 16B of disc. Because clamp flanges 46, 47, and 66 are substantially uniformly distributed about clamp aperture 45 (which is coaxially aligned with shaft 52), a substantially even clamp 14 exerts a substantially uniform axial clamping force on top surface 16B of disc 16. In other embodiments, clamp flange 47 may have other configurations designed to allow clamp flange 47 to engage with a respective hub flange.

Figure 4A:
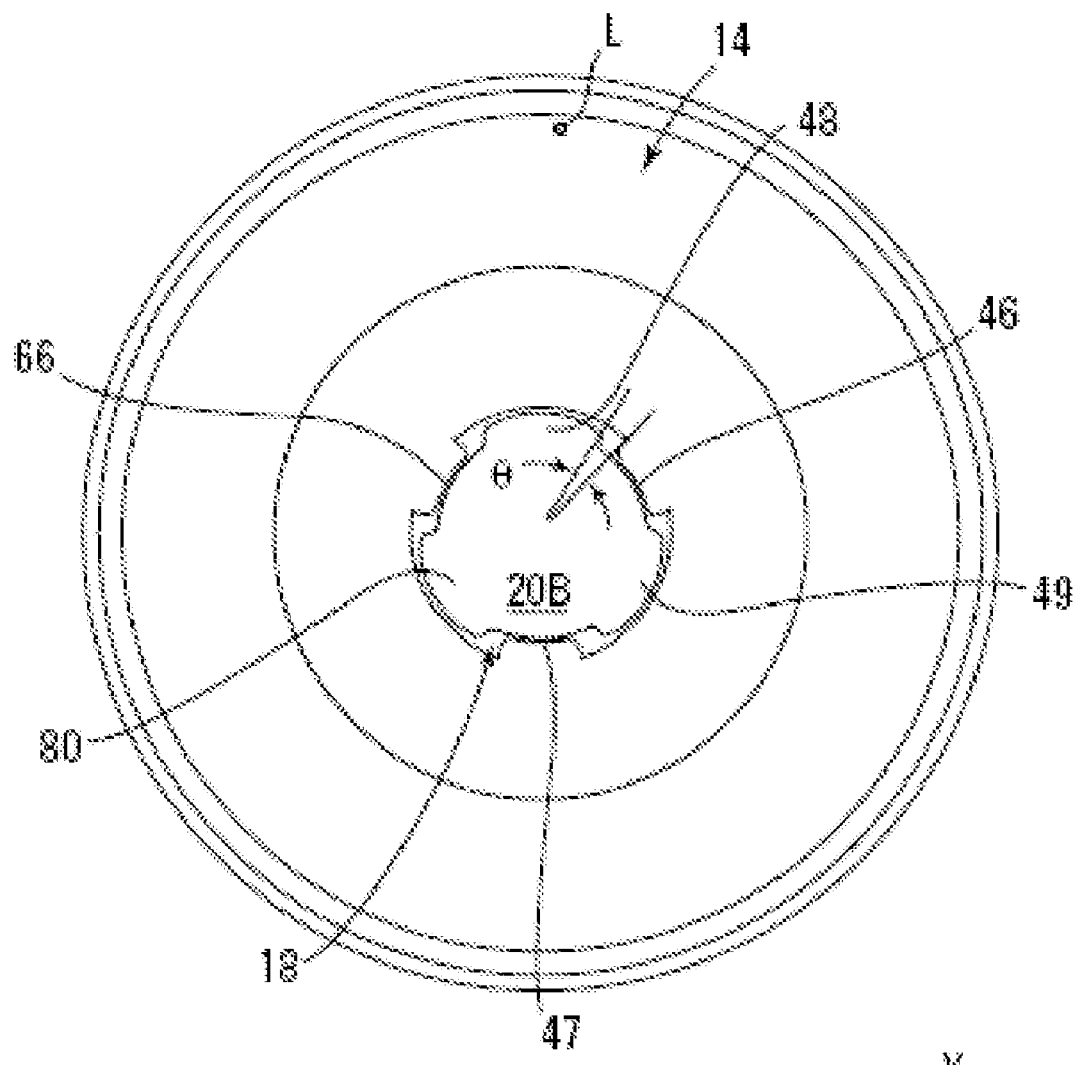
FIGS. 4A and 4B are plan views of the clamp and hub of the disc stack assembly of FIG. 1, where the clamp and hub are mated together.
Figure 4B:
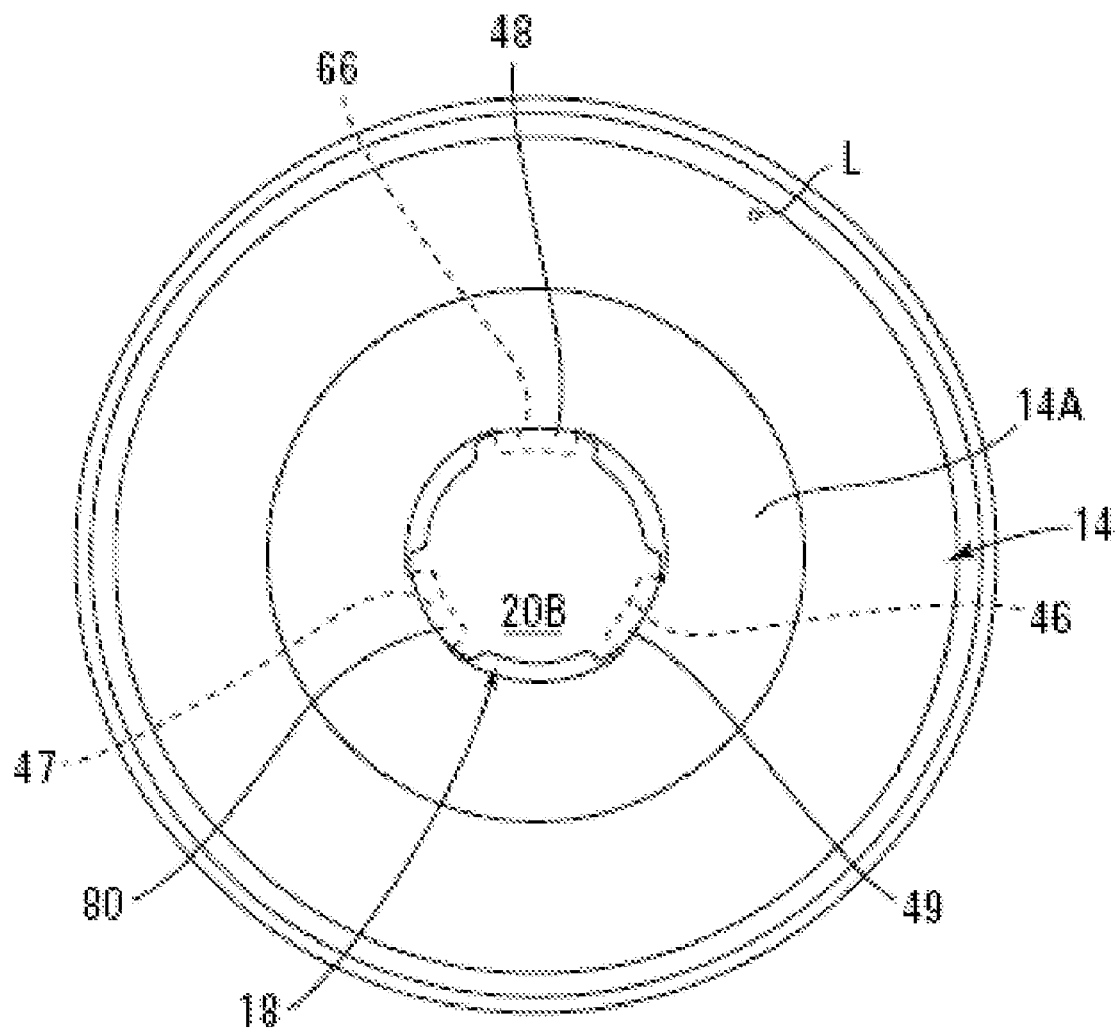

When installing clamp 14 around hub 18, clamp 14 and hub 18 are each in a particular rotational orientation. FIGS. 4A-4B illustrate steps in assembling clamp 14 and hub 18 together. Discs 16 and 17 are removed from FIGS. 4A-4B for clarity of illustration. FIG. 4A illustrates a plan view of clamp 14 in a first rotational orientation and hub 18, where protrusion portion 20 (particularly flange platform 20B) is extending through clamp aperture 45. Reference point L is provided to illustrate a second rotational orientation with respect to the first rotational orientation of clamp 14. In order for protrusion portion 20 to mate with clamp aperture 45, clamp 14 and hub 18 are arranged such that clamp flanges 46, 47, and 66 and hub flanges 48, 49, and 80 alternate. Otherwise stated, in order to fit protrusion portion 20 of hub 18 within clamp aperture 45, clamp 14 is in the first rotational orientation in which hub flanges 48, 49, and 80 are received in clamp void areas 68, 70, and 72, and clamp flanges 46, 47, and 66 are received in hub void areas 92, 94, and 96.

In order to aid installment of clamp 14 over hub 18, there is preferably a tolerance between each clamp flange 46, 47, and 66 and adjacent hub flanges 48, 49, and 80. The tolerance may be described in terms of an angular tolerance. In the embodiment shown FIG. 4A, there is an angular tolerance of about 2° to about 8° between clamp flange 46, 47, and 66 and adjacent hub flanges 48, 49, and 80. For example, as shown in FIG. 4A, angle Θ between clamp flange 46 and hub flange 48 is equal to about 5°.

Disc stack assembly 12 includes an inherent registration feature for registering clamp 14 to hub 18. Clamp aperture 45 may receive protrusion portion 20 of hub 18 in a discrete number of rotational orientations of clamp 14 because otherwise, clamp flanges 46, 47, and 66 and hub flanges 48, 49, and 80 may interfere, thereby preventing protrusion portion 20 of hub 18 from being received into clamp aperture 45.

FIG. 4B shows a clamp 14 in a second rotational orientation, whereby clamp 14 and hub 18 have been "locked" together. In order to achieve the second rotational orientation, clamp 14 is prestressed and rotated in a clockwise direction, as indicated by reference point L, which has been rotated in a clockwise direction compared to its position in FIG. 4A. Clamp 14 may be prestressed at any time prior to rotating clamp 14 into the second rotational orientation. In one embodiment, clamp 14 is prestressed by deflecting clamp flanges 46, 47, and 66 in a negative z-axis direction. Outer flange 43 may be held while deflecting clamp flanges 46, 47, and 66. In another embodiment, clamp 14 may be prestressed by deflecting outer flange 43. After introducing flange platform 20B of hub 18 into clamp aperture 45 such that flange platform 20B and stem 20A of protrusion portion 20 are disposed on opposite sides of clamp body 14A, clamp 14 is rotated relative to hub 18 from the first rotation orientation shown in FIG. 4A to the second rotational orientation shown in FIG. 4B. It may desirable for outer flange 43 to deflect in the positive z-axis direction to help prevent disc contact surface 57 of clamp 14 from contacting top surface 16B of disc 16 as clamp 14 is rotated. The degree of rotation of clamp 14 depends upon the number of clamp flanges 46, 47, and 66, as well as the distribution of clamp flanges 46, 47, and 66 about inner perimeter 45A of aperture 45 and the size of clamp flanges 46, 47, and 66 and hub flanges 48, 49, and 80. In the embodiment of clamp 14 and hub 18 shown in FIGS. 4A and 4B, clamp 14 is rotated about 30° in a clockwise direction in order to lock clamp 14 and hub 18 together.

In one embodiment, clamp 14 is preloaded in the first rotational orientation (shown in FIG. 4A), such as by deflecting clamp flanges 46, 47, and 66 in the z-axis direction (perpendicular to the plane of the image), towards hub 18. After clamp 14 is rotated into the second rotational orientation (shown in FIG. 4B), clamp 14 may be unloaded such that clamp flange 46 is drawn into engagement with hub flange 48, clamp flange 47 is drawn into engagement with hub flange 49, and clamp flange 66 is drawn into engagement with hub flange 80. As described in further detail in reference to FIGS. 10A and 10B, unloading clamp 14 may be a two-step process. In a first step, a load is removed from clamp flanges 46, 47, and 66 while outer flange 43 of clamp 14 is still in a deflected state, and in a second step, outer flange 43 may be undeflected (either by removing a load from outer flange 43 or otherwise releasing outer flange 43), such that disc contact surface 57 is drawn into engagement with disc 16. Bifurcating the unloading process helps reduce relative movement between disc contact surface 57 of clamp 14 and disc 16.

The engagement between clamp flanges 46, 47, and 66 and hub flanges 48, 49, and 80 fixes a position of clamp 14 with respect to hub 18 because prestressed clamp 14 applies a compressive force to both disc 16 and hub flanges 48, 49, and 80. In the embodiment shown in FIGS. 4A and 4B, clamp flanges 46, 47, and 66 fit closely within a channel formed between hub flanges 48, 49, and 80 and hub body 18A, respectively, such that clamp flanges 46, 47, and 66 press up against hub flanges 48, 49, and 80, respectively, as well as down against disc 16.

In addition, after protrusion portion 20 of hub 18 is received in clamp aperture 45, movement of clamp 14 in an x-y plane (orthogonal x-y-z axes are provided in FIG. 3A for purposes of illustration) is discouraged because there is little to no clearance between stem 20A of protrusion portion 20 of hub 18 and inner perimeter 45A of clamp aperture 45.

In an alternative embodiment, hub 18, rather than clamp 14, may be rotated between a first rotational orientation and a second rotational orientation in order to lock clamp 14 and hub 18 together.

Figure 5A:
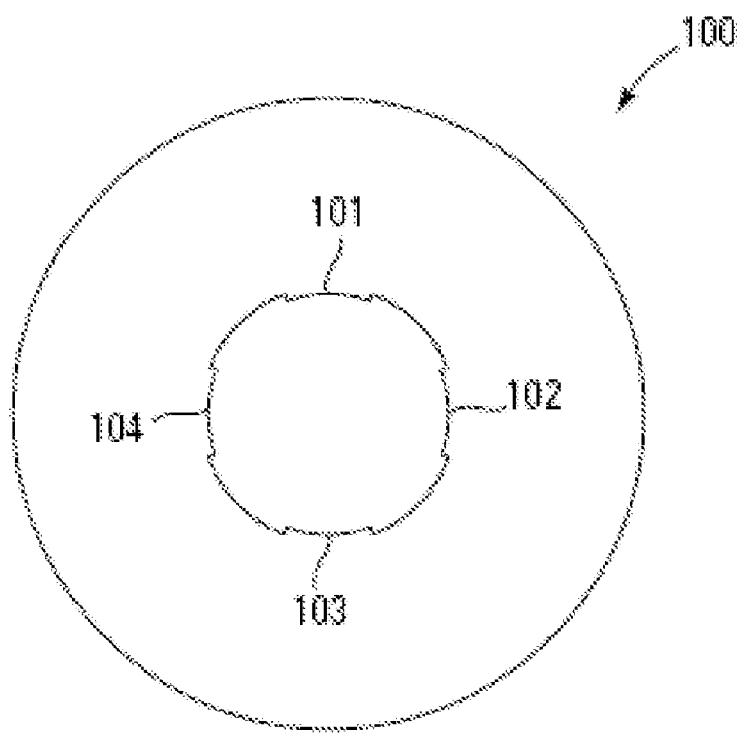
FIGS. 5A and 5B are plan views of other embodiments of a clamp for use in a disc stack assembly of the present invention.
Figure 5B:
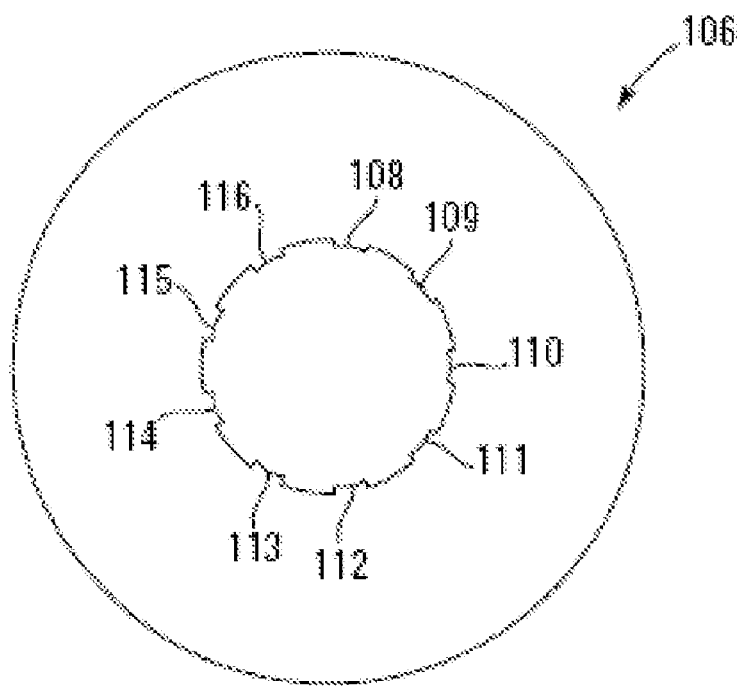

As previously described, clamp 14 of FIGS. 2-3A may be modified to include any suitable number of clamp flanges. FIGS. 5A and 5B illustrate examples of a clamp including a different number of clamp flanges. In FIG. 5A, clamp 100 includes four clamp flanges 101-104. Disc stack assembly 12 may also include a hub that includes four hub flanges that are configured to engage with clamp flanges 101-104 of clamp 100. In FIG. 5B, clamp 106 includes nine clamp flanges 108-116. Again, disc stack assembly 12 may also include a hub that includes nine hub flanges that are configured to engage with clamp flanges 108-116 of clamp 106.

Figure 6A:
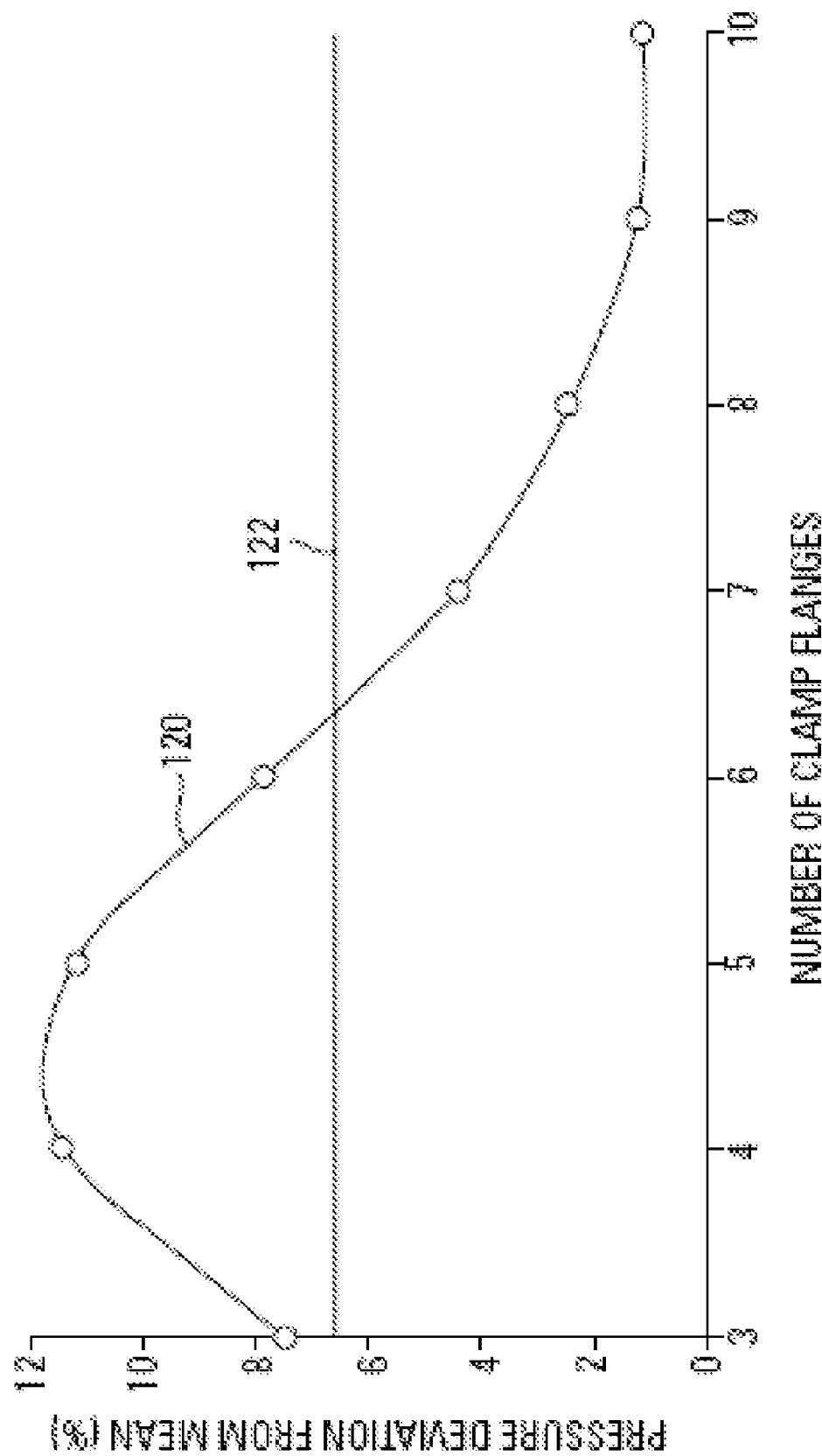
FIG. 6A is a graph illustrating the uniformity of a clamp to disc contact pressure (or force) as a function of the number of clamp flanges.

FIG. 6A is a graph illustrating the uniformity of pressure (or force) a clamp applies onto a disc as a function of the number of clamp flanges. In particular, line 120 represents the percentage a pressure deviates from a mean value for a plurality of clamps having a different number of clamp flanges. The mean pressure value is a baseline value that represents the mean pressure a clamp exerts on a magnetic medium along a disc contact surface at a particular prestress level of the clamp, regardless of the number of clamp flanges. The baseline value is used for comparative purposes and is not intended to limit the present invention in any way. Line 122 represents a mean pressure a clamp applies to a magnetic medium in a conventional 2.5 inch disc drive using a single screw to attach a clamp to a hub. The results shown in FIG. 6A were generated using computer modeling software. In particular, Ansys, a finite element software program available from Ansys, Inc. of Canonsburg, Pa.

The computer modeling suggests that a greater the number of clamp flanges (and accordingly, a greater the number of hub flanges that mate with the clamp flanges), results in less deviation from the mean pressure value. For example, a clamp including three clamp flanges (e.g., clamp 14 of FIGS. 2 and 3A) exerts a pressure that deviates about 7.5% from the baseline value. A clamp including five flanges exerts a pressure that deviates about 11% from the baseline value. In contrast, a clamp including nine clamp flanges (e.g., clamp 106 of FIG. 5B) exerts a pressure that only deviates about 1% from the baseline value. Less deviation from the mean pressure (baseline) value results in a more even distribution of pressure on a magnetic medium, and this may affect the flatness of the top surface of the magnetic medium, and therefore, the circumferential acceleration associated with the particular disc stack assembly.

FIG. 6B is a chart comparing circumferential acceleration associated with a top disc (i.e., the disc closest to the clamp) and a bottom disc in a disc stack assembly as a function of the number of clamp flanges, where the clamp has a configuration similar to that of clamp 14 shown in FIGS. 2 and 3A. The circumferential acceleration was measured at a disc radius of 0.55 inches (1.397 centimeters). In addition, the chart in FIG. 6B illustrates circumferential acceleration associated with top and bottom discs in the conventional single screw disc drive used in the modeling of FIG. 6A, and top and bottom discs in a disc drive including a disc stack assembly similar to disc stack assembly 12, but employing only three screws to attach a clamp to a hub, rather than a locking clamp and hub. The results shown in FIG. 6B were also generated using the Ansys finite element software program.

The computer modeling results shown in FIG. 6B suggest that a disc that is fixed to a hub using a clamp in accordance with the present invention results in lower circumferential acceleration than a disc in a conventional single screw disc drive or a disc drive employing three screws, regardless of the number of clamp flanges. For example, a top disc in the conventional single screw disc drive exhibited a circumferential acceleration of about 22 inches/square second (in/s$^2$) and a top disc in a three-screw disc drive results in a circumferential acceleration of about 56 in/s$^2$, while a top disc in a disc stack assembly in accordance with the present invention including a clamp having three flanges resulted in a circumferential acceleration of about 5 in/s$^2$. A top disc in a disc stack assembly in accordance with the present invention including a clamp having ten flanges resulted in circumferential acceleration less than 1 in/s$^2$.

In addition to including any suitable number of clamp flanges and hub flanges, other configurations of clamps and hubs are also contemplated. In general, the present invention is directed toward disc stack assemblies including a clamp and hub that include flanges that do not engage with each other when the clamp (or hub) is in a first rotational orientation and are drawn into engagement when the clamp (or hub) is in a second rotational orientation. Thus, the clamp may include clamp flanges in any suitable arrangement and the hub may include complementarily arranged hub flanges. From the perspective of the hub, it can likewise be said that the hub may include hub flanges in any suitable arrangement and the clamp may include complementarily arranged clamp flanges.

The present invention recognizes that a hardware-less attachment between a clamp and hub of a disc stack assembly is beneficial in some applications of the disc stack assembly. In addition, the clamp and hub configuration is selected in accordance with the principles of the present invention such that the clamp and hub exert a substantially uniformly distributed force on one or more magnetic media of the disc stack assembly.

Figure 7:
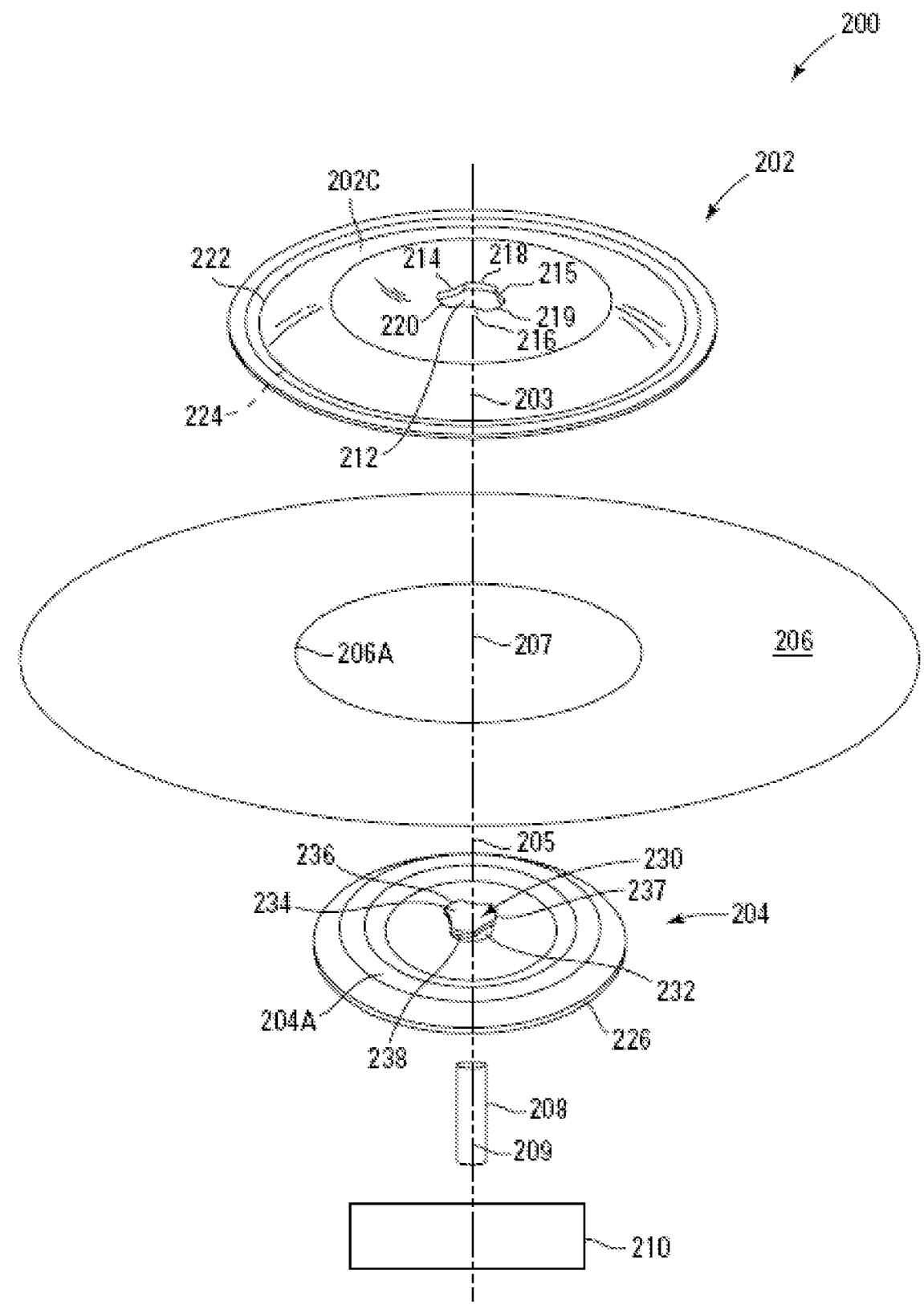
FIG. 7 is an exploded perspective view of another embodiment of a disc stack assembly in accordance with the present invention.

FIG. 7 illustrates an exploded perspective view of another embodiment of disc stack assembly 200 including clamp 202 having center axis 203 and hub 204 having center axis 205 in accordance with the present invention. Disc stack assembly 200 further includes disc 206 having axis of rotation 207, shaft 208 having axis of rotation 209, and spindle motor 210 (schematically shown), which are similar to disc 16, shaft 50, and spindle motor 52 of FIG. 3A. As with FIG. 3A, clamp 202, hub 204, and disc 206 are not shown in accurate relative proportions. Center axis 203 of clamp 202, disc 206 axis of rotation 207, center axis 205 of hub 205, and shaft 208 axis of rotation 209 are coaxially aligned.

In the embodiment shown in FIG. 7, clamp 202 is symmetrical about center axis 203. In other embodiments, clamp 202 may be asymmetrical about center axis 203, depending on the type of rotation desired for clamp 202 and/or disc stack assembly 200. Clamp 202 includes clamp body 202A defining aperture 212. While in the embodiment shown in FIG. 7, aperture 212 is centered with respect to clamp body 202A, in some embodiments, clamp aperture 212 may be offset relative clamp body 202A in order to create eccentric rotation of clamp 202 relative to disc 206 axis of rotation 207.

Extending from clamp body 202A into aperture 212 are clamp flanges 214-216. Void areas 218-220 are defined between adjacent clamp flanges 214-216. In the embodiment shown in FIG. 7, clamp flanges 214-216 and clamp body 202A are integral. In other embodiments, clamp flanges 214-216 may be attached to clamp body 202A (e.g., by welding, mechanical attachment means or an adhesive). In the embodiment shown in FIG. 7, clamp flanges 214-216 are substantially perpendicular to center axis 203 of clamp 202. In alternate embodiments, clamp 202 may include any suitable number of flanges of any suitable size and oriented at any suitable angle with respect to center axis 203 of clamp 202.

Annular indentation 222 within clamp body 202A near an outer perimeter 202B of clamp 202 defines a disc contact surface 224 (in phantom lines). Disc contact surface 224 positively engages with disc 206 when disc stack assembly 200 is assembled.

Hub 204 includes hub body 204A including cylindrical surface 226, and protrusion portion 230 extending from hub body 204A. Protrusion portion 230 includes stem 232 and flange platform 234. Flanges 236-238 extend from flange platform 234, and define void areas 240-242. In the embodiment shown in FIG. 7, hub 204 is an integral unit. However, in some embodiments, one or more of the elements (e.g., stem 232 and flange platform 234 of protrusion portion 230, and flanges 236-238) of hub 204 may be separate from and attached to hub body 204A using any suitable attachment means, such as welding, a mechanical attachment means or an adhesive. Furthermore, in the embodiment shown in FIG. 7, hub 204 is symmetrical about center axis 205. In other embodiments, hub 204 may be asymmetrical about center axis 205, depending on the type of rotation desired for hub 204 and/or disc stack assembly 200.

As with clamp 14 and hub 18 of FIG. 3A, clamp 202 and hub 204 include complementary surface configurations so that clamp body 14A and hub body 18A mate together when disc stack assembly 12 is assembled. In particular, top surface 202C of clamp 202 and hub body 18A have similar curved cross-sections, which allows clamp body 202A and hub body 204A to mate together. In the embodiment of disc stack assembly 200 shown in FIG. 7, the mating portions of clamp 202 and hub 204 (i.e., clamp flanges 214-216 and hub flanges 236-238, respectively) have different configurations than that of clamp 14 and hub 18.

Flange platform 234 of protrusion portion 230 of hub 204 and clamp aperture 212 of clamp 202 have complementary shapes, due to the extension of hub flanges 236-238 from flange platform 234 and the extension of clamp flanges 214-216 into clamp aperture 212. Accordingly, when disc stack assembly 200 is assembled, shaft 208 is received in protrusion portion 230 of hub 204, inner perimeter 206A of disc 206 is disposed around cylindrical surface 226 of hub 204, and aperture 212 of clamp 202 is receives protrusion portion 230 of hub 204.

Figure 8A:
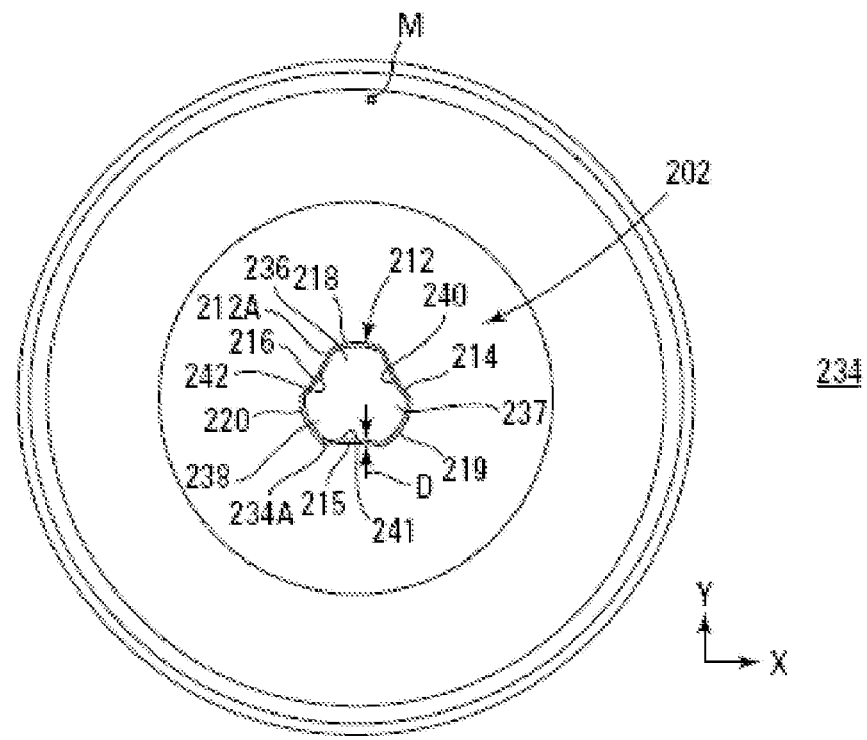
FIGS. 8A and 8B are plan views of the clamp and hub of the disc stack assembly of FIG. 7, where the clamp and hub are mated together.

FIG. 8A illustrates a plan view of a first rotational orientation of clamp 202, in which hub flange platform 234 is received in and protrudes through clamp aperture 212 of clamp 202. Disc 206 is removed from FIG. 8A for clarity of illustration. Reference point M is provided to illustrate a rotational movement of clamp 202 from the first rotational orientation to a second rotational orientation. In order for protrusion portion 230 (particularly, hub flange platform 234) to mate with clamp aperture 212, clamp 202 and hub 204 are arranged such that clamp flanges 214-216 are received in hub void areas 240-242, respectively, and hub flanges 236-238 are received in clamp void areas 218-220, respectively. In contrast to hub 14 and clamp 18 of FIG. 5A, there is little to no angular tolerance between clamp flanges 214-216 and hub flanges 236-238. Rather, in order to aid installment of hub protrusion portion 230 into clamp aperture 212, outer edge 234A of hub flange platform 234 and inner edge 212A of clamp aperture 212 are separated by distance D.

The complementary shapes of clamp aperture 212 and hub flange platform 234 helps register clamp 202 and hub 204 together during assembly of disc stack assembly 200. Clamp aperture 212 may receive hub flange platform 234 in a discrete number of rotational orientations of clamp 202 because otherwise, clamp flanges 214-216 and hub flanges 236-238 may interfere.

Figure 8B:
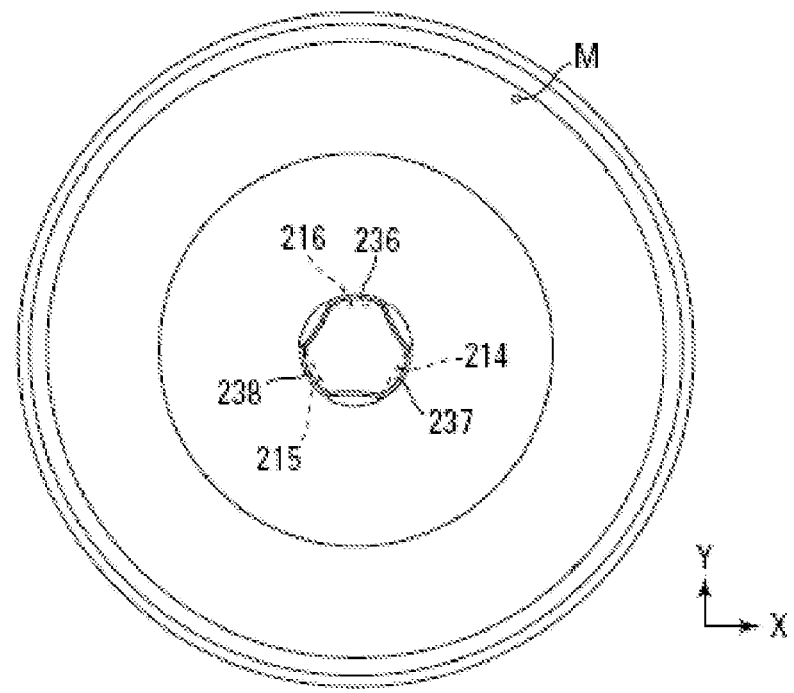

FIG. 8B shows a clamp 202 in a second rotational orientation, which results when clamp 202 is prestressed and rotated about 30° in a clockwise direction after hub flange platform 234 is received in and extended through clamp aperture 212 (as shown in FIG. 8A). The rotation of clamp 202 is also demonstrated by the rotation of reference point M, which has been rotated in a clockwise direction compared to its position in FIG. 8A. The degree of rotation of clamp 202 between the first and second rotational orientation may depend upon the number of clamp flanges 214-216 and hub flanges 236-238 because clamp 202 is rotated enough to draw at least one clamp flange 214-216 into engagement with at least one hub flange 236-238.

In one embodiment, clamp 202 is preloaded in the first rotational orientation (shown in FIG. 8A), such as by deflecting clamp flanges 214-216 in the z-axis direction, towards hub 204. After hub flange platform 234 is introduced through clamp aperture 212 (while clamp 212 is prestressed), such that hub flange platform 234 and hub body 204A are disposed on opposite sides of clamp body 202A, clamp 202 is rotated into the second rotational orientation (shown in FIG. 8B). Thereafter, clamp 202 may be unloaded such that clamp flange 214 is drawn into engagement with hub flange 237, clamp flange 215 is drawn into engagement with hub flange 238, and clamp flange 216 is drawn into engagement with hub flange 236. As with the previous example discussed in reference to FIG. 4B, clamp 202 may be unloaded in at least two steps. The engagement between clamp flanges 214-216 and hub flanges 236-238 locks clamp 202 and hub 204 together because clamp flanges 214-216 apply a compressive force to both disc 206 and hub flanges 236-238. In addition, after protrusion portion 230 of hub 204 is received in clamp aperture 212, movement of clamp 202 in an x-y plane is discouraged because there is little to no clearance between stem 232 of protrusion portion 230 and inner perimeter 212A of clamp aperture 212.

In an alternative embodiment, hub 204, rather than clamp 202, may be rotated between a first rotational orientation and a second rotational orientation in order to lock clamp 202 and hub 204 together.

The present invention provides a positively mechanically clamped disc stack assembly without the use of external hardware, adhesive or retaining ring to attach a clamp to a hub in order to fix one or more magnetic media to the hub. As a result, a process (e.g., an automated assembling process) for forming a disc stack assembly in accordance with the invention is streamlined, and possibly more cost-effective because the external hardware may be removed from the disc stack assembly. In one embodiment of an automated assembling process, one or more computer controlled devices (e.g., installation tools) may align a clamp, disc, and hub together to form a disc stack assembly.

External hardware may introduce contaminants into the disc drive assembly during the assembly process, which is generally undesirable. For example, particles may generate when screws are driven into the disc drive assembly. Thus, the elimination of external hardware in some embodiments of the present invention also helps minimize contaminants in the disc drive assembly.

Figure 9:
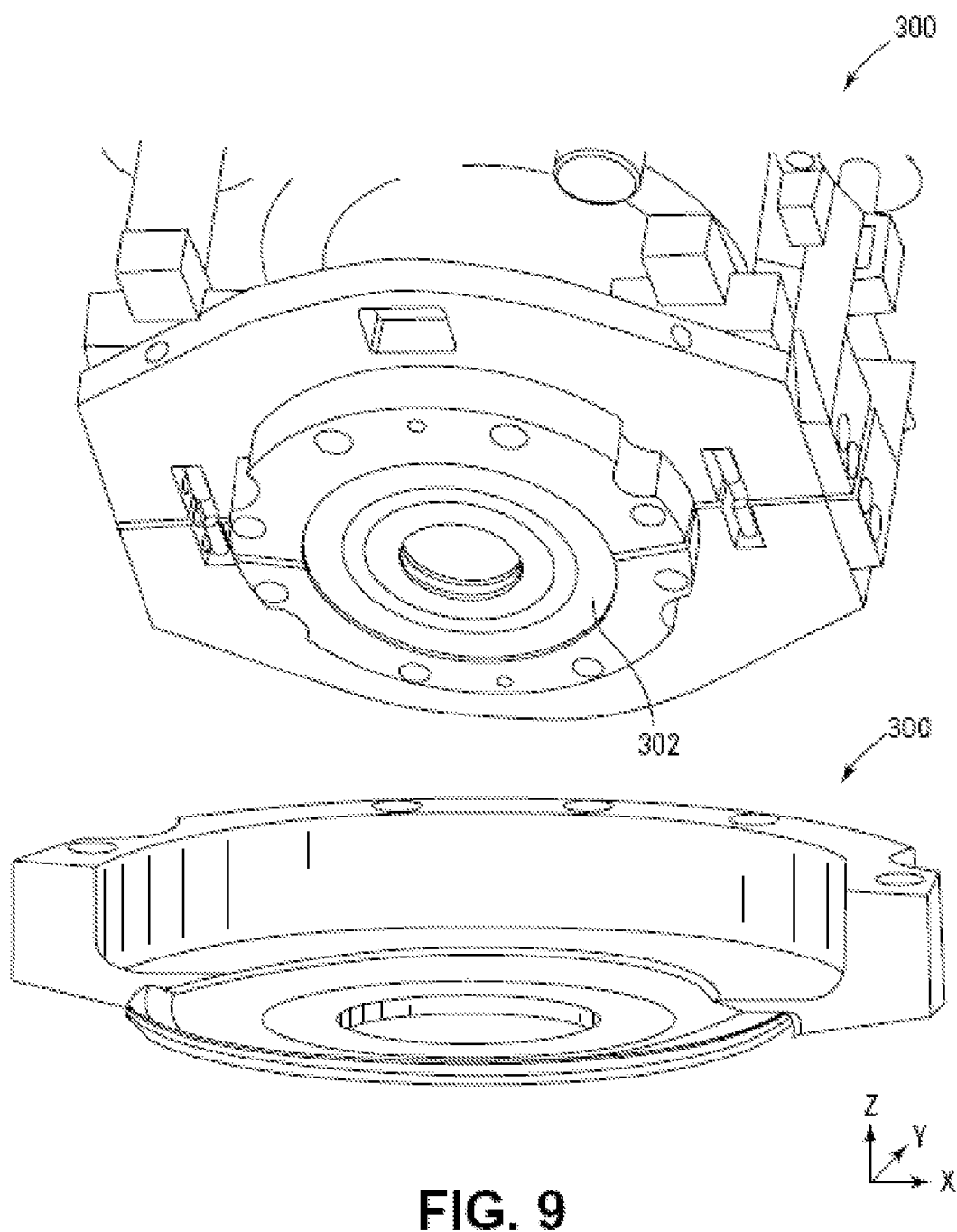
FIG. 9 is a perspective view of a computer controlled installation tool aligned to attach a preloaded clamp to a disc and hub stack.

FIG. 9 illustrates an example of installation tool 300 (partially shown), which is grasping clamp 302 in order to attach clamp 302 to a disc and hub stack (not shown). Installation tool 300 is described in further detail in commonly-assigned U.S. Patent Publication No. 2008/0250629, entitled, "ASSEMBLY AND METHOD FOR INSTALLING A DISC CLAMP," which was filed on Apr. 12, 2007 and published on Oct. 16, 2008, and which is incorporated herein by reference in its entirety. Installation tool 300 is capable of prestressing clamp 302 by flexing (i.e., deflecting) clamp flanges 317 and 318 (shown in FIGS. 10A and 10B) in the negative z-direction prior to attaching clamp 302 to the hub of disc and hub stack 304. As shown in FIGS. 4A and 4B, and FIGS. 8A and 8B, a prestressed clamp 302 is stacked on the hub in a first rotational orientation and rotated to a second rotational orientation in order to lock clamp 302 and the hub together.

FIG. 10A shows a cross-sectional view of installation tool 300 (partially shown) aligned with disc and hub stack 304 (partially shown), and illustrates a preloading of clamp 302. More specifically, installation tool 300 and stack 304 are coaxial such that center longitudinal axis 306 of installation tool 300 is aligned with center axis 308 of stack 304. Installation tool 300 includes inner portion 305, intermediate portion 310, outer portion 312, and alignment member 314. Clamp 302 defines clamp aperture 315 and includes disc contact surface 316, clamp flanges 317 and 318, and outer flange 321. Stack 304 includes hub 319, first disc 320, spacer 322, second disc 324, and shaft 326, which is rotationally coupled to a spindle motor. Hub 319 further includes hub protrusion portion 328, and hub flanges 330 and 332 extending from hub protrusion portion 328. Shaft 326 defines cavity 328, which is configured to receive alignment member 314 of installation tool 300.

Alignment member 314 is sized for insertion into a spindle assembly to align installation tool 300 with a spindle assembly. Outer portion 312 is spaced radially outwardly from inner portion 305 and includes multiple sections that are movable in a z-axis direction. In particular, outer portion 312 includes portions that engage and release clamp 302, as shown in FIG. 10A. Portions 312A and 312B of outer portion 312 are movable in an x-axis direction (i.e., an axial direction) to supply a first preload force in a positive z-axis direction proximate to an outer edge of clamp 302. A portion of outer portion 312 and a portion of outer flange 321 of clamp 302 share a cross-sectional profile, as shown in region 329, enabling outer portion 312 to engage with and grasp clamp 302.

Intermediate portion 310 is spaced radially inwardly (i.e., along the y-axis direction) from outer portion 312 and is movable in a negative z-axis direction relative to inner portion 305 of installation tool to supply a second preload force to an clamp flanges 317 and 318 in a direction towards the spindle hub. In particular, intermediate portion 310 prestresses clamp 302 by applying a substantially axial load onto clamp flanges 317 and 318, thereby deflecting clamp flanges 317 and 318 in the negative z-axis direction, resulting in prestressed clamp 302'. In reaction to the deflection of clamp flanges 317 and 318 in the negative z-axis direction, outer flange 321 of clamp 302 deflects in the positive z-axis direction. In some embodiments, outer portion 312 may also purposefully apply a load to deflect outer flange 321 in the positive z-axis direction. The load intermediate portion 310 applies to clamp flanges 317 and 318 depends upon many factors, including, but not limited to, the number and size of discs in stack 304, the speed at which the discs will spin during operation of a disc drive incorporating stack 304, a thickness of flanges 317 and 318, and a thickness of hub flanges 330 and 332. For example, clamp flanges 317 and 318 are preferably deflected in a negative z-axis direction a distance that enables clamp flanges 317 and 318 to clear hub flanges 330 and 332, respectively. In addition, clamp 302 is deflected such that disc contact surface 316 does not contact disc 320 when rotating clamp 302 from the first rotational orientation to the second rotational orientation.

Installation tool 300 advances prestressed clamp 302' toward stack 304 while prestressed clamp 302' is in a first rotational orientation (e.g., the orientation shown in FIG. 4A or 7A). Installation tool 300 advances prestressed clamp 302' until surface 336 of installation tool 300 contacts surface 319A of hub 319. Alignment member 314 of installation tool 300 centers installation tool 300 with respect to hub 319. In particular, alignment member 314 is introduced into cavity 334 of shaft 326. At a later time, a screw may inserted into cavity 334 in order to attach a top cover to a disc drive system in which stack 304 is incorporated into. At that point, hub protrusion portion 328 is introduced into clamp aperture 315. Installation tool 300 may rotate clamp 302 into a second rotational orientation (e.g., the orientation shown in FIG. 4B or 7B) such that clamp flanges 317 and 318 fit within grooves 338 and 340, respectively, formed between hub flanges 330 and 332, respectively. Clamp 302 preferably does not contact disc 320 when clamp 302 is rotated in order to prevent damaging disc 320 as clamp 302 is rotated.

Installation tool 300 may also include members that engage with hub 319 in order to hold hub 319 in place as clamp 302 is rotated. Hub 319 may be rotatably coupled to a spindle motor shaft or coupled to a rotatable shaft, and either case, hub 319 may move relative to clamp 302 as clamp is rotated, which may hinder the engagement of clamp flanges 317 and 318 with hub flanges 330 and 332, respectively. Thus, in some embodiments, installation tool 300 includes features that engage with hub 319 and discourage hub 319 from rotating as clamp 302 is rotated into the second rotational orientation.

The members may access hub 319 through, for example, void areas defined between clamp flanges 317 and 318. As discussed above, spanner holes in clamp 302 are typically used to access hub 319. However, the particular configuration of clamp 302 in accordance with the present invention, removes the necessity for such spanner holes. It may be disadvantageous to include spanner holes in clamp 302 because of the pressure deviations the spanner holes may introduce into clamp 302, and thus, the uneven clamping force clamp 302 may exert on disc 320.

Once intermediate portion 310 of installation tool 300 removes the prestressing load from clamp 302, clamp flanges 317 and 318 deflect in a positive z-axis direction and engage with hub flanges 330 and 332 (as shown in FIG. 10B) because clamp flanges 317 and 318 are predisposed to return to their original (nondeflected) position. In one embodiment, prestressed clamp 302' is unloaded in at least two steps. In a first step, intermediate portion 310 releases clamp flanges 317 and 318, thereby drawing clamp flanges 317 and 318 into engagement with hub flanges 330 and 332, respectively. In a second step, grasping member releases outer flange 321 of clamp 302, such that disc contact surface 316 of clamp 302 is lowered into contact with disc 320. By releasing the load from prestressed clamp 302' in these two steps, the relative movement between clamp 302 and disc 320 is reduced because disc contact surface 316 contacts disc 320 at or near a final contact location on disc 320. Because most or all of the deflection is removed from clamp 302 prior to disc contact surface 316 contacting disc 320, damage to disc 320 is reduced, thereby reducing circumferential acceleration attributable to misshaping of disc 320. If the load is released in one step, clamp 302 may move relative to disc 320 as clamp 302 returns to its original, unstressed state, which may be undesirable.

Once clamp flanges 317 and 318 and hub flanges 330 and 332 are engaged, discs 320 and 324 are securely fixed to hub 319, and additional hardware or an adhesive are not required to fix clamp 302 to hub 319. Thus, an additional step is not necessary to securely attach clamp 302 to hub 319. As previously discussed, in some embodiments, additional hardware or an adhesive may be used.

If clamp 302 is not prestressed 302' prior to introducing hub protrusion portion 328 into clamp aperture 315, clamp flanges 317 and 318 may share a z-axis coordinate with hub flanges 330 and 332, respectively, which may act as a barrier to clamp 302 when rotating from the first rotational orientation to the second rotational orientation.

FIG. 10B illustrates assembled disc stack assembly 350. Clamp flanges 317 and 318 are engaged with hub flanges 330 and 332 such that clamp 302 applies a substantially uniform compressive force onto disc 320 along annular disc contact surface 316. Disc 320 transmits the compressive force to disc 324 (not shown in FIG. 10B). In this way, discs 320 and 324 are substantially clamped to hub 319. When disc stack assembly 350 is implemented into a disc drive system (e.g., disc drive system 10 of FIG. 1), a spindle motor rotates shaft 326, which thereby rotates hub 319, which is coupled to shaft 326. As hub 319 rotates, clamp 302 and discs 320 and 324, which are coupled to hub 319, rotate. Clamp 302 helps prevent circumferential acceleration during operation of the disc drive system.

FIG. 10C illustrates a schematic block diagram of an embodiment of installation tool 300. As previously described, installation tool 300 includes a head portion 301 having inner portion 305, intermediate portion 310, and outer portion 312. Inner portion 305 includes alignment member 314 that is configured to engage with shaft 326 (not shown in FIG. 10C) of a spindle assembly in order to align head portion 301 of installation tool 300 with the spindle assembly. Also shown in FIG. 10C are controller 360, preload actuator 362, preload actuator 364, driver 366, rotator 368, and gripper mechanism 370. Controller 360 is electrically connected to and controls each of the functional modules, i.e., preload actuator 362, preload actuator 364, driver 366, rotator 368, and gripper mechanism 370, to apply a load to clamp 302.

In the embodiment shown in FIG. 10C, controller 360 controls preload actuator 362, which is coupled to gripper portions 312A and 312B of outer portion 312 to move gripper portions 312A, 312B in a positive z-axis direction, as indicated by arrow 372, relative to the spindle motor assembly to supply a preload force to the outer portion of clamp 302. Gripper mechanism 370, under the control of controller 360, moves gripper portions 312A and 312B between different positions to grasp clamp 302. As previously discussed, the preload force helps prevent clamp 302 from contacting a disc or other magnetic medium while clamp 302 is applied on the spindle hub 312 (shown in FIG. 10A). Driver 366 moves tool head 301 relative to disc and hub stack 304 (shown in FIG. 10A). Actuator 364 is coupled to intermediate portion 310 of installation tool 300 and moves intermediate portion 310 in a negative z-axis direction, as indicated by arrow 374, relative to disc and hub stack 304 to supply a preload force to clamp 302. Controller 360 also controls rotator 368 to rotate tool head 301 to rotate clamp 302 between different rotational orientations relative to disc and hub stack 304 in order to draw clamp flanges 317 and 318 (shown in FIG. 10A) into engagement with hub flanges 330 and 332 (shown in FIG. 10A) of hub 319.

Figure 11:
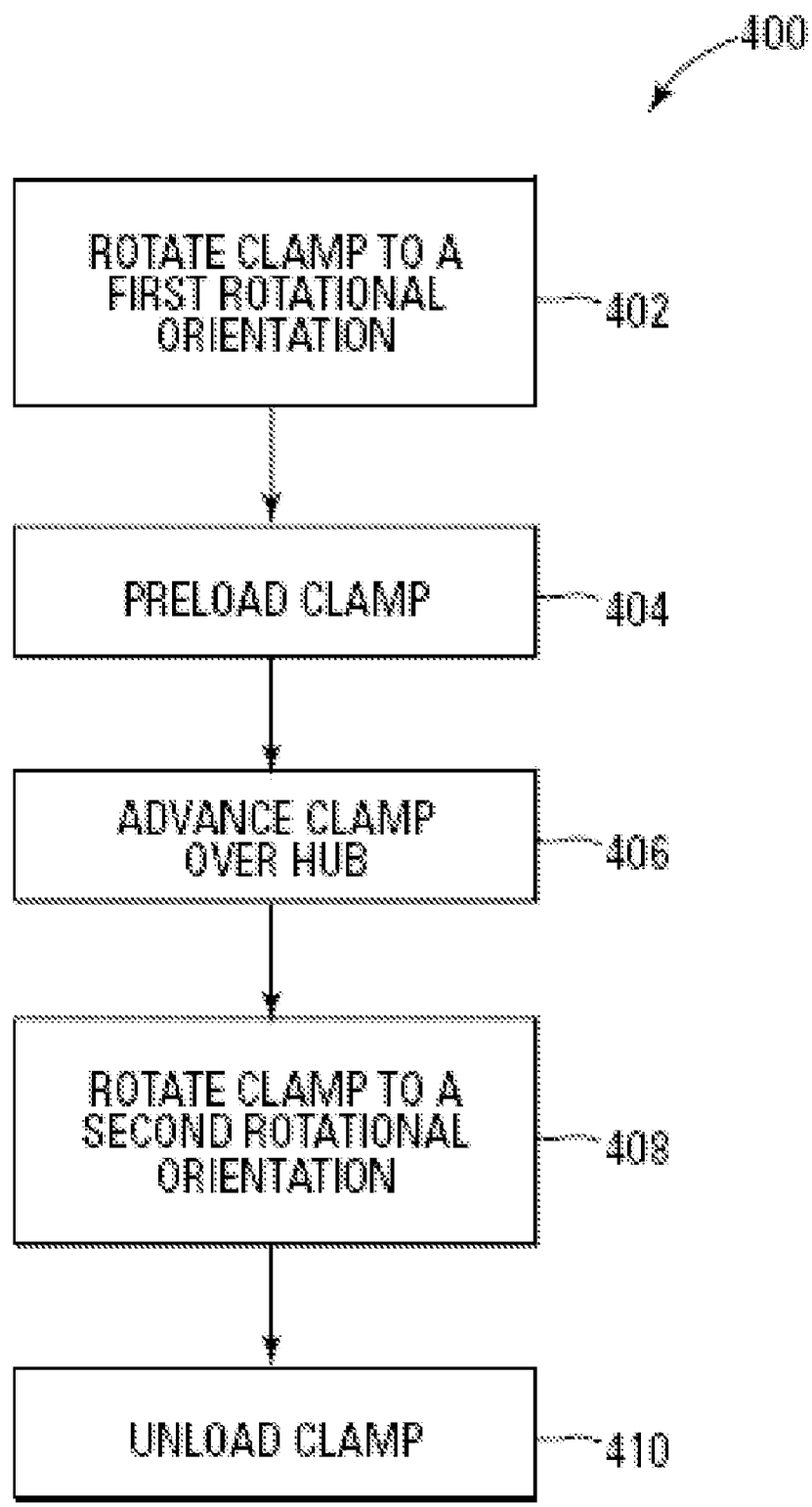
FIG. 11 is a flow diagram illustrating a process for fixing a magnetic medium to a motor hub with a clamp.

FIG. 11 is a flow diagram illustrating a process 400 of installing a clamp onto a hub of a disc stack assembly in accordance with the present invention. If necessary, the clamp is rotated to a first rotational orientation, where the clamp flanges are aligned with respect to hub flanges (402). The term "alignment" does not necessarily mean the clamp flanges are aligned to overlap (i.e., have overlapping x-axis and y-axis coordinates) with the hub flanges. In some embodiments, such as the embodiments discussed above in reference to FIGS. 4A, 4B, 8A, and 8B, in the first rotational orientation, the clamp flanges and hub flanges do not overlap, but from a plan view, alternate. As a result, the clamp flanges are received in hub void areas defined between the hub flanges, and the hub flanges are received in clamp void areas defined between the clamp flanges.

The clamp is then preloaded (404). For example, the clamp flanges may be preloaded with an installation tool, as discussed with respect to FIGS. 10A and 10B. Additionally, an outer flange (e.g., outer flange 43 of clamp 302 shown in FIG. 3A) of the clamp may be loaded. The clamp may be preloaded (404) while the clamp is in the first rotational orientation, or alternatively, the clamp may be rotated into the first rotational orientation (402) after the clamp is preloaded (404).

The preloaded clamp is advanced over the hub (406), such that the hub flanges and clamp flanges are in two different planes, and the clamp body is adjacent to the hub body. In some embodiments, the clamp body is disposed between the hub flanges and the hub body. Furthermore, in some embodiments, the clamp is loaded onto the spindle hub such that the clamp is slid into a groove of the spindle hub. The clamp is rotated from the first rotational orientation to a second rotational orientation (408) and a load, e.g., a load applied in a negative z-axis direction, is released from the clamp flanges (410) in order to draw the clamp flanges and hub flanges into engagement. The installation tool may include a rotator feature that allows the installation tool to rotate the clamp relative to the hub. After the clamp and hub flanges are drawn into engagement, a installation tool, or any other suitable device that is used to load clamp 302, may release a load, e.g., a positive z-axis load, from the outer flange of the clamp in order to engage a disc contact surface of the clamp with an underlying disc (or other magnetic medium) (410). The clamp may then be released from the installation tool. Alternatively, the load may be released (410) as the clamp is rotated from the first rotational orientation to the second rotational orientation (408).

Various embodiments of the invention have been described. These and other embodiments are within the scope of the following claims.

The invention claimed is:

1. A magnetic medium stack assembly comprising:
   a hub rotatable about an axis of rotation, the hub comprising a hub body and a hub flange, wherein the hub body defines a channel, and the hub flange defines a hub void area;
   a clamp comprising a contact surface and a clamp flange defining a clamp void area, wherein in a first rotational orientation, the clamp flange is received in the hub void area and the hub flange is received in the clamp void area, and in a second rotational orientation, the clamp flange is engaged with the hub flange and the clamp flange is disposed in the channel; and
   a magnetic medium fixed to the hub by the clamp, wherein the contact surface of the clamp contacts the magnetic medium
   wherein the clamp flange is configured to be received in the channel when the clamp flange is axially deflected by a stress force.

2. The assembly of claim 1, wherein the hub body comprises a protrusion portion extending from the hub body, the hub flange extending from the protrusion portion.

3. The assembly of claim 2, wherein the clamp further comprises a clamp body and the clamp body defines a clamp aperture configured to receive the protrusion portion of the hub, and the clamp flange extends into the clamp aperture.

4. The assembly of claim 1, wherein the hub flange comprises a plurality of hub flanges defining a plurality of hub void areas, and the clamp flange comprises a plurality of clamp flanges defining a plurality of clamp void areas, wherein in the first rotational orientation, each of the plurality of clamp flanges are received in at least one respective hub void area of the plurality of hub void areas and each of the hub flanges are received in a respective clamp void area of the plurality of clamp void areas, and in the second rotational orientation, the plurality of clamp flanges are engaged with at least one of the plurality of hub flanges.

5. The assembly of claim 4, wherein the hub flange comprises up to ten hub flanges and the clamp flange comprises up to ten clamp flanges.

6. The assembly of claim 4, wherein the clamp body defines a clamp aperture and the plurality of clamp flanges radially extend into the clamp aperture.

7. The assembly of claim 4, wherein the hub further comprises a hub protrusion portion, the plurality of hub flanges being equally spaced and radially extending from the hub protrusion portion.

8. The assembly of claim 1, wherein a radial tolerance between the hub flange and the clamp flange in the first rotational orientation of the clamp is about 2° to about 8°.

9. The assembly of claim 1, wherein the contact surface of the clamp is substantially annular.

10. The assembly of claim 9, wherein a substantially annular indentation defined by the clamp defines the contact surface.

11. The assembly of claim 1, wherein in the second rotational orientation, the clamp flange is engaged with the hub flange such that the contact surface of the clamp applies a substantially uniform compressive force on the magnetic medium.

12. A disc drive comprising:
a spindle motor;
a hub rotatably coupled to the spindle motor, wherein the hub comprises a hub body and at least one hub flange, and wherein the hub body defines a channel and the at least one hub flange defines a hub void area;
a disc rotatable by the spindle motor via the hub; and
a clamp fixing the disc to the hub, the clamp comprising a clamp body defining an aperture configured to receive at least a portion of the hub and at least a first clamp flange and a second clamp flange, the first and second clamp flanges defining at least one receiving void area, wherein the receiving void area is configured to receive the at least one hub flange when the clamp is in a first rotational orientation, and at least one of the first flange or the second flange are configured to engage with the at least one hub flange when the clamp is in a second rotational orientation, and wherein at least one of the first clamp flange or the second clamp flange are configured to be received by the channel when the at least one of the first clamp flange or the second clamp flange are axially deflected by a stress force.

13. The disc drive of claim 12, wherein the clamp body further defines an annular indentation defining a disc contact surface and the clamp applies a compressive force on the disc along the disc contact surface.

14. The disc drive of claim 13, wherein the clamp is configured to apply a substantially uniform compressive force on the disc along the disc contact surface.

15. The disc drive of claim 12, wherein a radial tolerance between the hub flange and the first clamp flange in the first rotational orientation of the clamp is about 2° to about 8°.

16. A method of assembling a magnetic storage apparatus, the method comprising:
preloading a clamp comprising a clamp body defining a clamp aperture and at least a first clamp flange and a second clamp flange extending from the clamp body, the first and second clamp flanges defining a clamp void area, wherein preloading the clamp comprises applying a load to deflect the first and second clamp flange in a first direction;
aligning the clamp void area with at least one of a first hub flange and a second hub flange extending from a protrusion portion of a hub, wherein the hub comprises a hub body that defines a channel;
introducing the protrusion portion of the hub into the clamp aperture; and
rotating the clamp to place the first and second clamp flanges in the channel, and to engage the first hub flange with the first clamp flange and the second hub flange with the second clamp flange.

17. The method of claim 16, and further comprising unloading the clamp after the first hub flange is engaged with the first clamp flange and the second hub flange is engaged with the second clamp flange.

18. The method of claim 17, wherein preloading the clamp further comprises deflecting an outer flange of the clamp in a second direction, and wherein unloading the clamp comprises:
releasing the load and undeflecting the first and second clamp flanges; and
undeflecting the outer flange of the clamp after the load is released.

19. The method of claim 16, and further comprising mounting a magnetic medium around the hub, wherein the method further comprises drawing a contact surface of the clamp body into engagement with the magnetic medium.

20. The method of claim 19, wherein the contact surface is substantially annular.

* * * * *